(12) United States Patent
Kunik et al.

(10) Patent No.: US 8,163,045 B2
(45) Date of Patent: *Apr. 24, 2012

(54) METHOD AND SYSTEM OF MAKING A BURNABLE FUEL

(75) Inventors: Burton J. Kunik, Houston, TX (US); James C. Berns, Carthage, TX (US); David G. Gossman, Zwingle, IA (US)

(73) Assignee: Sharps Compliance, Inc, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/649,215

(22) Filed: Dec. 29, 2009

(65) Prior Publication Data
US 2011/0155029 A1    Jun. 30, 2011

(51) Int. Cl.
*C10L 5/00* (2006.01)

(52) U.S. Cl. .................. 44/589; 44/605; 44/530; 44/550

(58) Field of Classification Search ............ 44/530–535, 44/550, 552, 589, 590, 594, 595, 596, 597, 44/598, 605, 606, 504, 551, 593
See application file for complete search history.

(56) References Cited

U.S. PATENT DOCUMENTS

| | | | |
|---|---|---|---|
| 4,236,897 A * | 12/1980 | Johnston | 44/530 |
| 4,395,265 A | 7/1983 | Reilly et al. | |
| 4,529,407 A | 7/1985 | Johnston et al. | |
| 4,822,379 A * | 4/1989 | Thompson | 44/589 |
| 5,106,594 A | 4/1992 | Held et al. | |
| 5,173,257 A | 12/1992 | Pearson | |
| 5,188,649 A | 2/1993 | Macedo et al. | |
| 5,223,231 A * | 6/1993 | Drake | 422/297 |
| 5,265,545 A | 11/1993 | Milner | |
| 5,270,000 A | 12/1993 | Goldner et al. | |
| 5,342,418 A | 8/1994 | Jesse | |
| 5,464,454 A * | 11/1995 | Jeney et al. | 44/629 |
| 5,643,342 A | 7/1997 | Andrews | |
| 5,743,924 A | 4/1998 | Dospoy et al. | |
| 5,830,419 A | 11/1998 | Held et al. | |
| 5,833,922 A | 11/1998 | Held et al. | |
| 5,837,171 A | 11/1998 | Danzik et al. | |
| 5,888,256 A | 3/1999 | Morrison | |
| 6,045,070 A | 4/2000 | Davenport | |
| 6,344,638 B1 | 2/2002 | Tomasello | |
| 6,506,223 B2 | 1/2003 | White | |
| 6,635,093 B1 | 10/2003 | Schoen et al. | |
| 7,032,322 B1 | 4/2006 | Smith | |
| 7,565,299 B2 | 7/2009 | Mallett et al. | |
| 2006/0096163 A1 | 5/2006 | Dickinson et al. | |
| 2008/0029444 A1 | 2/2008 | Mallett et al. | |
| 2008/0073251 A1 | 3/2008 | Reshamwala et al. | |
| 2008/0247904 A1 | 10/2008 | Paskalov | |
| 2008/0274022 A1 * | 11/2008 | Boykin et al. | 422/199 |
| 2009/0283015 A1 | 11/2009 | Gasser et al. | |

FOREIGN PATENT DOCUMENTS

| | | |
|---|---|---|
| JP | 10263022 A | 10/1998 |
| JP | 10263023 A | 10/1998 |

* cited by examiner

*Primary Examiner* — Cephia D Toomer
*Assistant Examiner* — Pamela H Weiss
(74) *Attorney, Agent, or Firm* — Robert W Strozier

(57) ABSTRACT

Methods and systems are disclosed for direct conversion of a used or waste material into a burnable fuel and to burnable fuels derived therefrom.

27 Claims, 27 Drawing Sheets

METHOD AND SYSTEM OF MAKING A BURNABLE FUEL

RELATED APPLICATIONS

This application is related to co-pending U.S. patent application Ser. No. 12/610,331, filed 1 Nov. 2009 (Nov. 1, 2009). This application is incorporated herein by reference as set forth in the closing paragraph of the specification, that closing paragraph operable to incorporate by reference all articles, patents or applications to the full extent allowed by the Law of the United States and for the purposes set forth therein.

BACKGROUND OF THE INVENTION

1. Field of the Invention

Embodiments of the present invention relate to methods for making a burnable fuel from used or waste materials, to systems for converting the used or waste materials into a burnable fuel, to burnable fuels derived from the methods and systems and methods and systems for using the burnable fuel.

More particularly, embodiments of the present invention relate to methods for making a burnable fuel from used or waste materials, to systems for converting the used or waste materials into a burnable fuel source, to burnable fuels derived from the methods and systems and methods and systems for using the burnable fuel, where the methods include the steps of providing one or a plurality of used or waste materials to form an input material, sizing the input material to form a sized burnable fuel. The method can also include the step of shaping the sized burnable fuel into a shaped burnable fuel. The method can also include one or more pre-processing or pre-treating steps.

2. Description of the Related Art

Many used or waste materials are currently being recycled, especially in today's climate of environmentalism. However, many used or waste materials include bio-hazardous materials or other materials that are a challenge for bulk recycling. Labeling requirements for bio-hazardous used or waste materials may require these materials to be handled in a different manner than many other waste materials.

Moreover, most used or waste materials constitute complex mixtures of components including pulp materials, fabric materials, plastic or polymer materials, metals or metal containing materials, ceramic materials, ceramic containing materials, bio-hazardous materials, etc. Many conventional waste material recycling methodologies require a separation of the material into separated components, especially metals and metal containing materials, before the material can then be post processed.

Thus, there is a need in the art for methods and systems that can readily convert used or waste materials directly into a burnable fuel without the need for exhaustive component separation.

SUMMARY OF THE INVENTION

Embodiments of this invention provide methods for converting one or a plurality of used or waste source materials, each material including a complex mixture of components including pulp materials, fiber materials, fabric materials, plastic or polymer materials, metals or metal containing materials, ceramic materials, ceramic containing materials, bio-hazardous materials, ash materials, and/or other waste materials directly into a burnable fuel, without the need for exhaustive component separation. The burnable fuel can also optionally include a solid fuel and/or liquid fuel, that may be added into the waste materials at any point in the processing. The burnable fuel can also optionally include virgin pulp materials, virgin fiber materials, virgin polymer materials, virgin ceramic materials and/or other virgin materials or mixtures or combinations thereof. The burnable fuel can also optionally include unused pulp materials, unused fiber materials, unused polymer materials, unused ceramic materials and/or other unused materials or mixtures or combinations thereof. The methods can also include shaping the burnable fuel into a compact shaped burnable fuel.

Embodiments of this invention provide systems for converting one or a plurality of used or waste materials, each material including a complex mixture of components including pulp materials, fiber materials, fabric materials, plastic or polymer materials, metals or metal containing materials, ceramic materials, ceramic containing materials, bio-hazardous materials, ash materials, and/or other waste materials directly into a burnable fuel, without the need for exhaustive component separation. The burnable fuel can also optionally include a solid fuel and/or liquid fuel. The burnable fuel can also optionally include virgin pulp materials, virgin fiber materials, virgin polymer materials, virgin ceramic materials and/or other virgin materials or mixtures or combinations thereof. The burnable fuel can also optionally include unused pulp materials, unused fiber materials, unused polymer materials, unused ceramic materials and/or other unused materials or mixtures or combinations thereof. The systems can also include a shaping subsystem for shaping the burnable fuel into a compact shaped burnable fuel. The system can also include a subsystem for combusting the burnable fuel and converting a portion of the resulting thermal energy into a useable form of energy or into a useful product.

Embodiments of this invention provide burnable fuels derived from methods and systems of this invention.

BRIEF DESCRIPTION OF THE DRAWINGS

The invention can be better understood with reference to the following detailed description together with the appended illustrative drawings in which like elements are numbered the same.

Methods with Pre-Processing Step

Figure 2A:
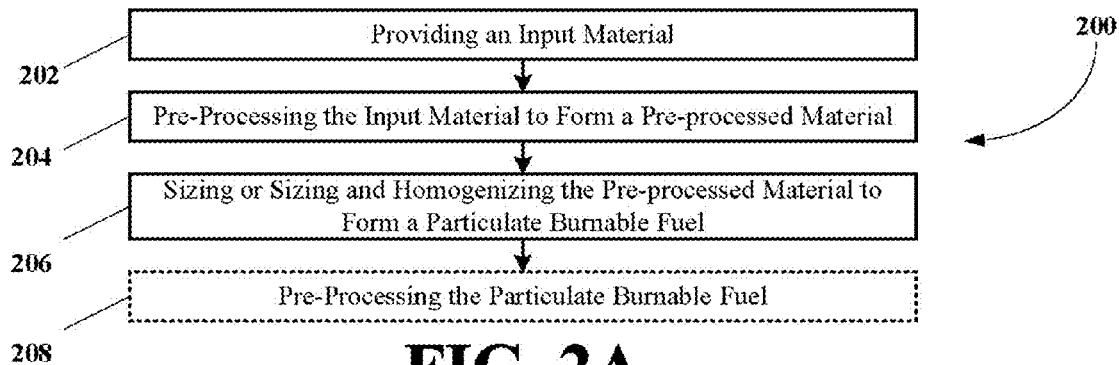

FIG. 2A depicts an embodiment of conceptual flow diagram of a method of this invention.

Figure 2B:
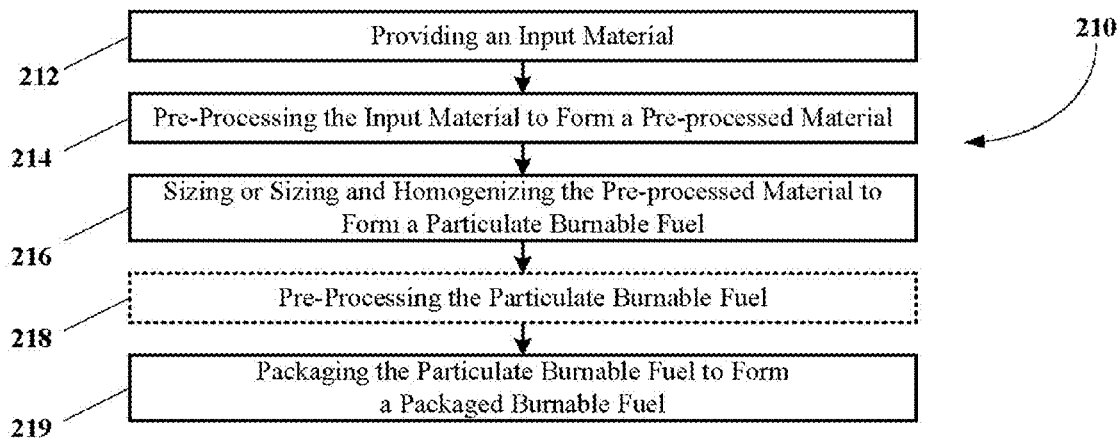

FIG. 2B depicts another embodiment of conceptual flow diagram of a method of this invention.

Figure 2C:
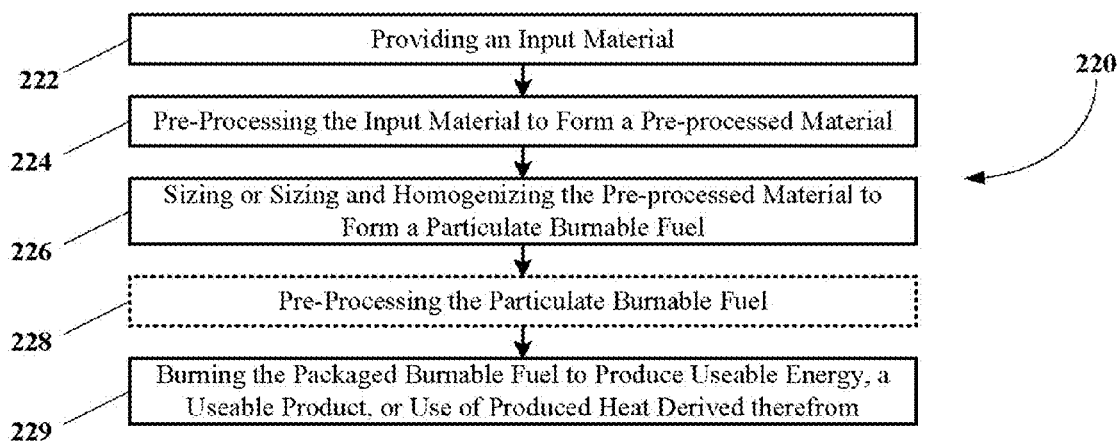

FIG. 2C depicts another embodiment of conceptual flow diagram of a method of this invention.

Figure 2D:
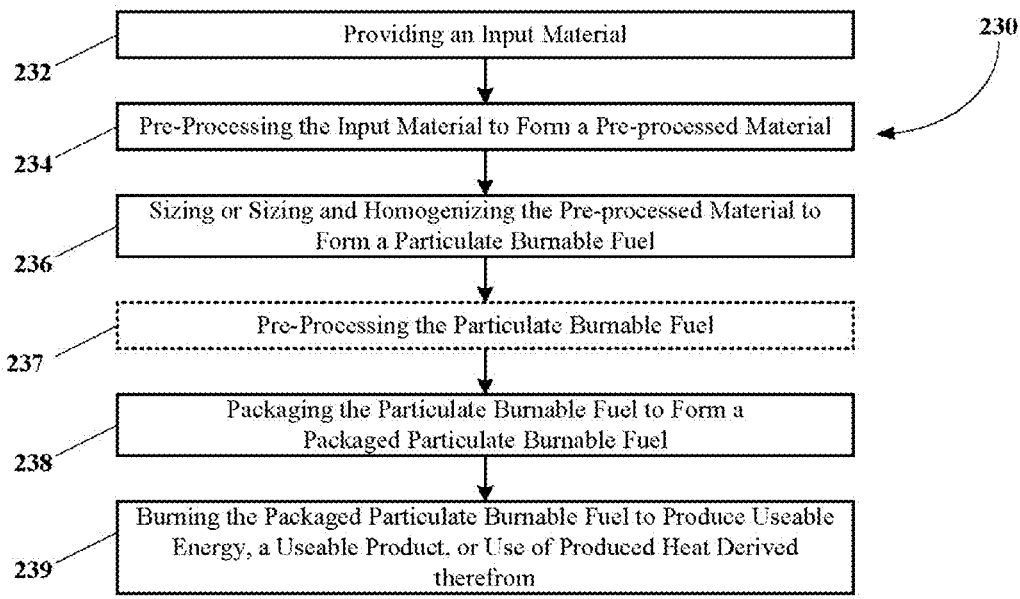

FIG. 2D depicts another embodiment of conceptual flow diagram of a method of this invention.

Figure 2E:
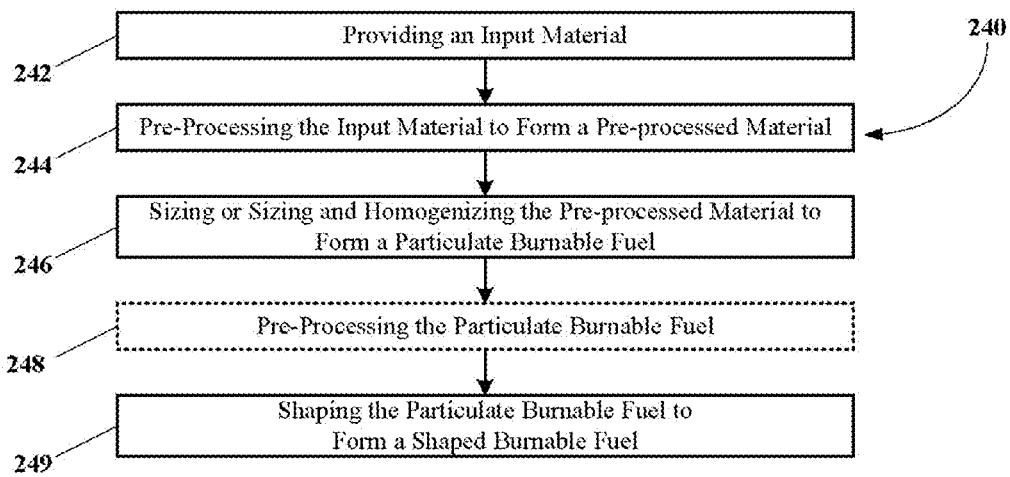

FIG. 2E depicts another embodiment of conceptual flow diagram of a method of this invention.

Figure 2F:
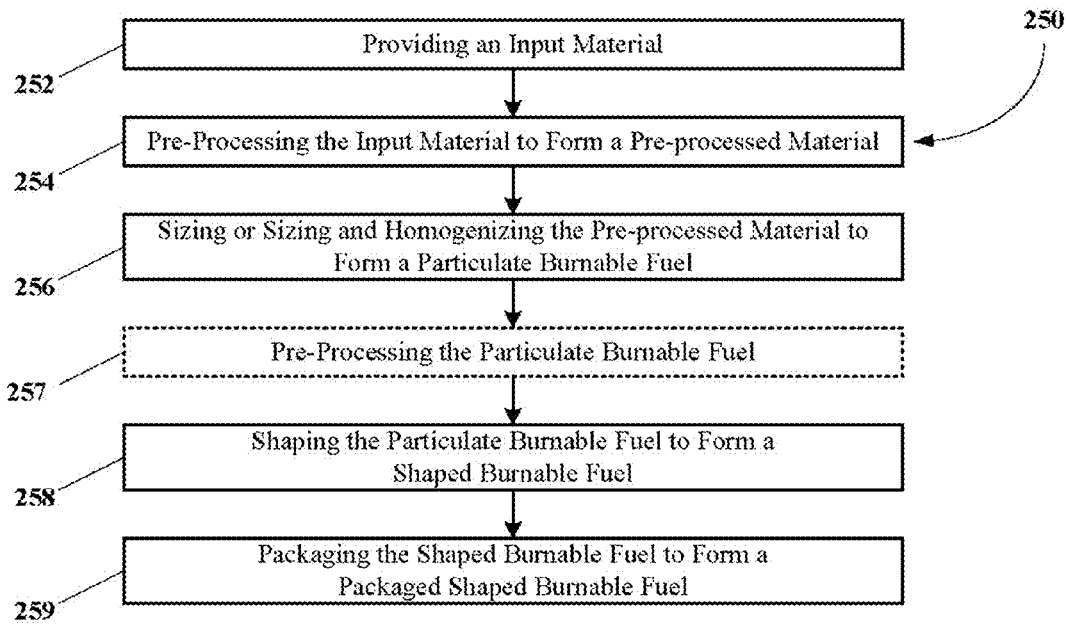

FIG. 2F depicts another embodiment of conceptual flow diagram of a method of this invention.

Figure 2G:
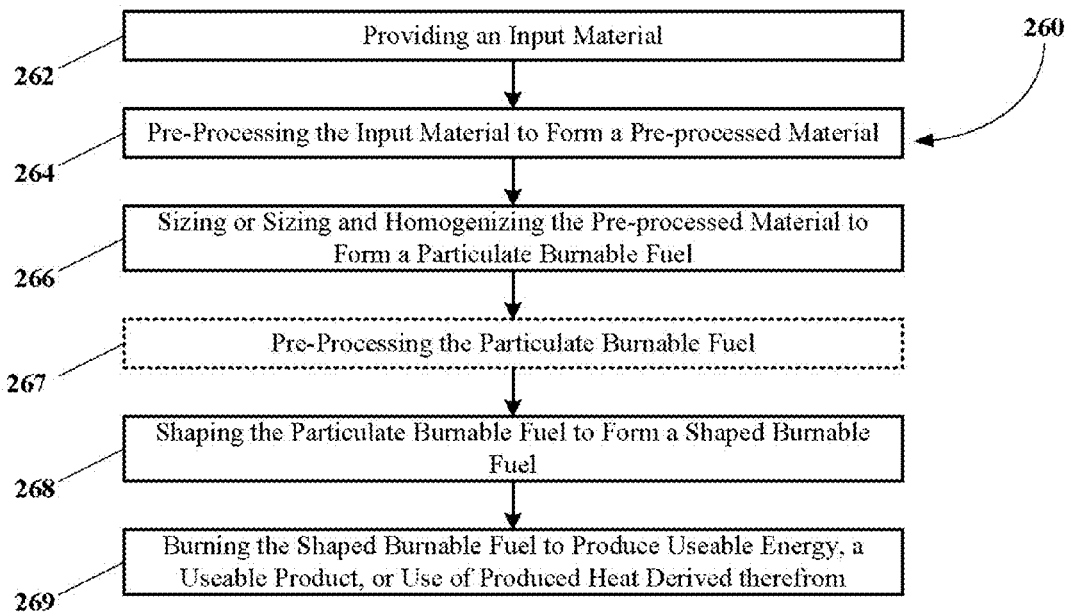

FIG. 2G depicts another embodiment of conceptual flow diagram of a method of this invention.

Figure 2H:
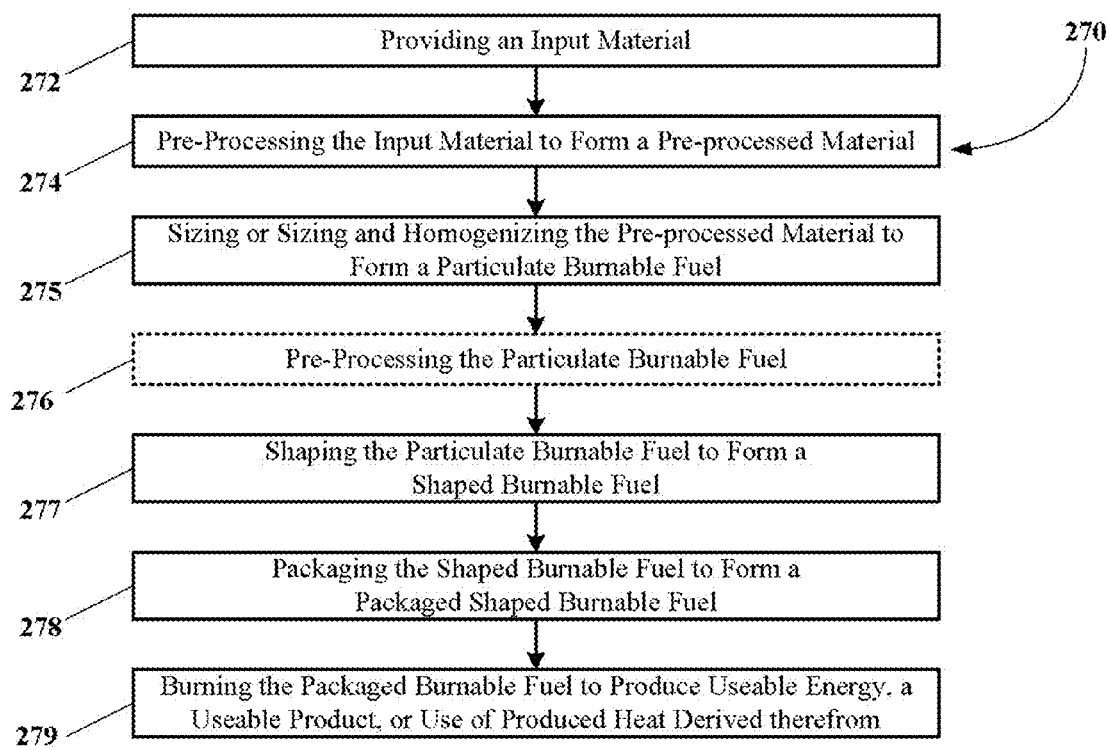

FIG. 2H depicts another embodiment of conceptual flow diagram of a method of this invention.

Method with Two Source Material

Figure 3A:
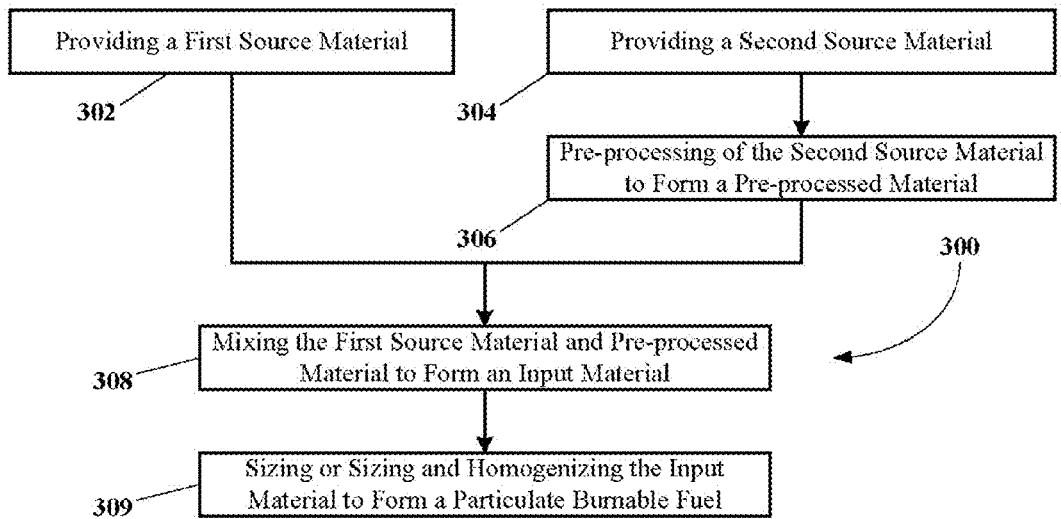

FIG. 3A depicts an embodiment of conceptual flow diagram of a method of this invention.

Figure 3B:
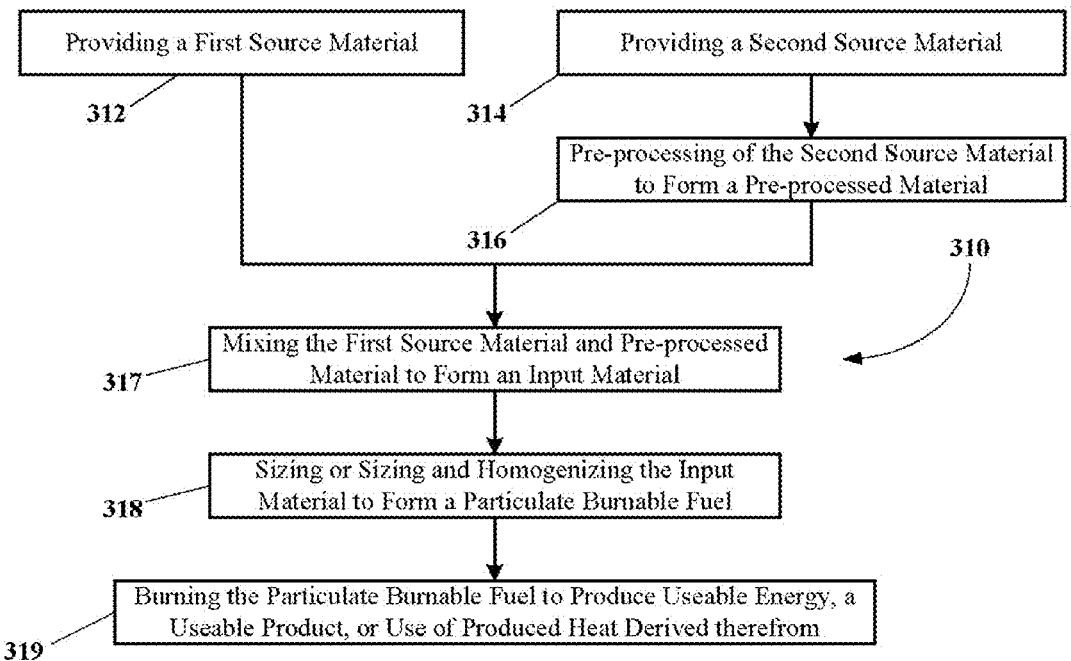

FIG. 3B depicts another embodiment of conceptual flow diagram of a method of this invention.

Figure 3C:
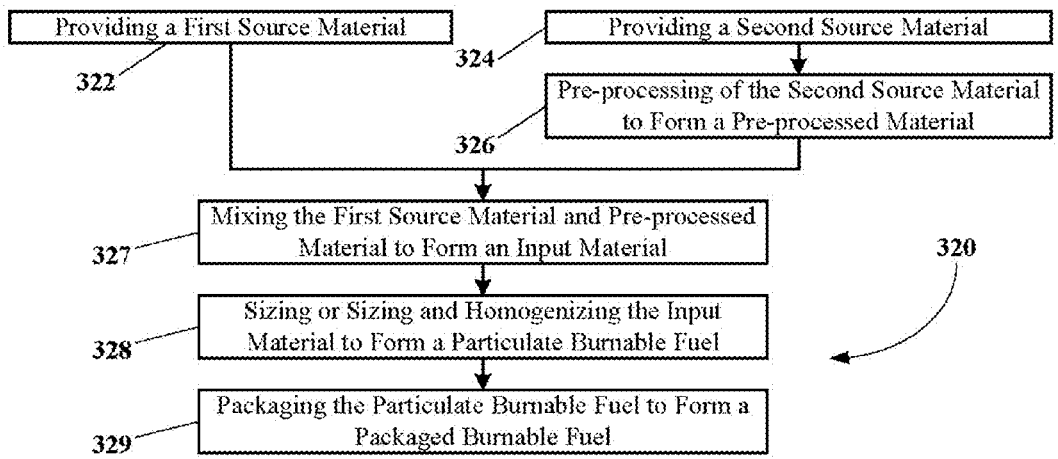

FIG. 3C depicts another embodiment of conceptual flow diagram of a method of this invention.

Figure 3D:
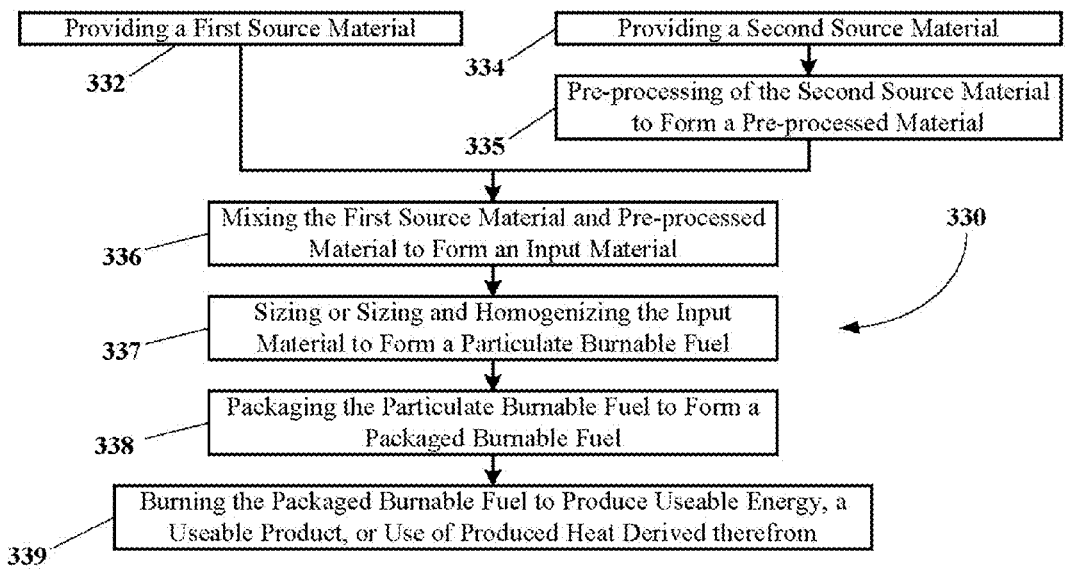

FIG. 3D depicts another embodiment of conceptual flow diagram of a method of this invention.

Figure 3E:
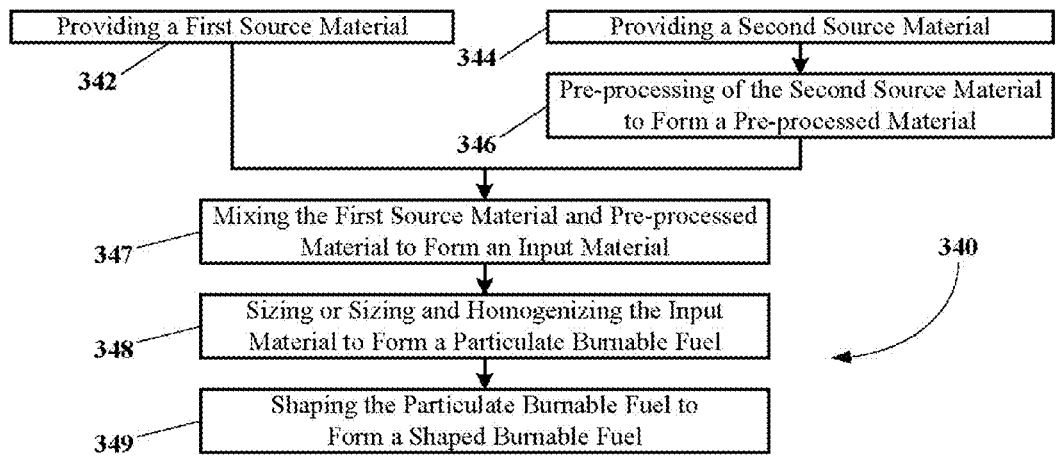

FIG. 3E depicts another embodiment of conceptual flow diagram of a method of this invention.

Figure 3F:
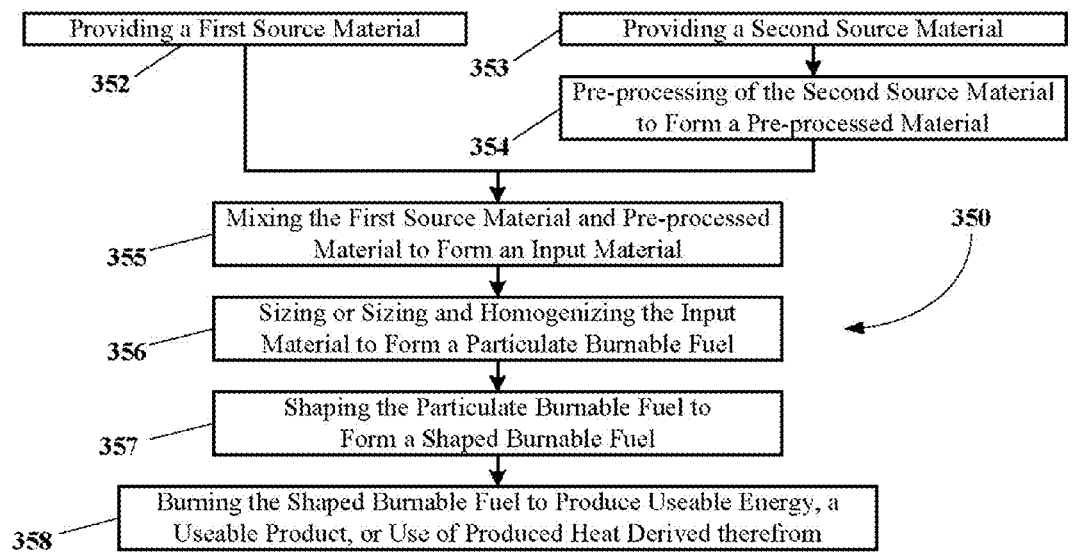

FIG. 3F depicts another embodiment of conceptual flow diagram of a method of this invention.

Figure 3G:
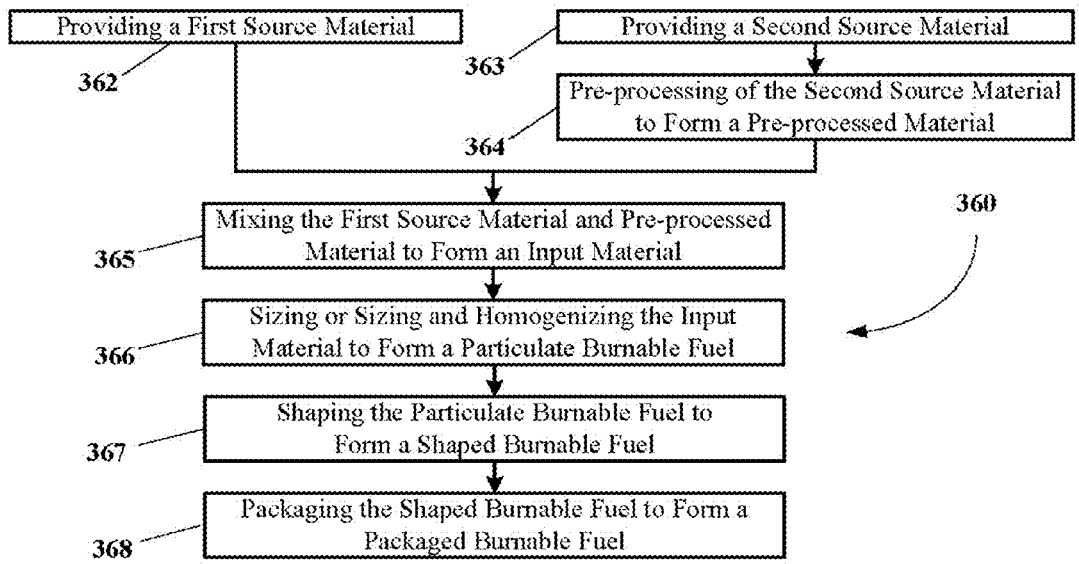

FIG. 3G depicts another embodiment of conceptual flow diagram of a method of this invention.

Figure 3H:
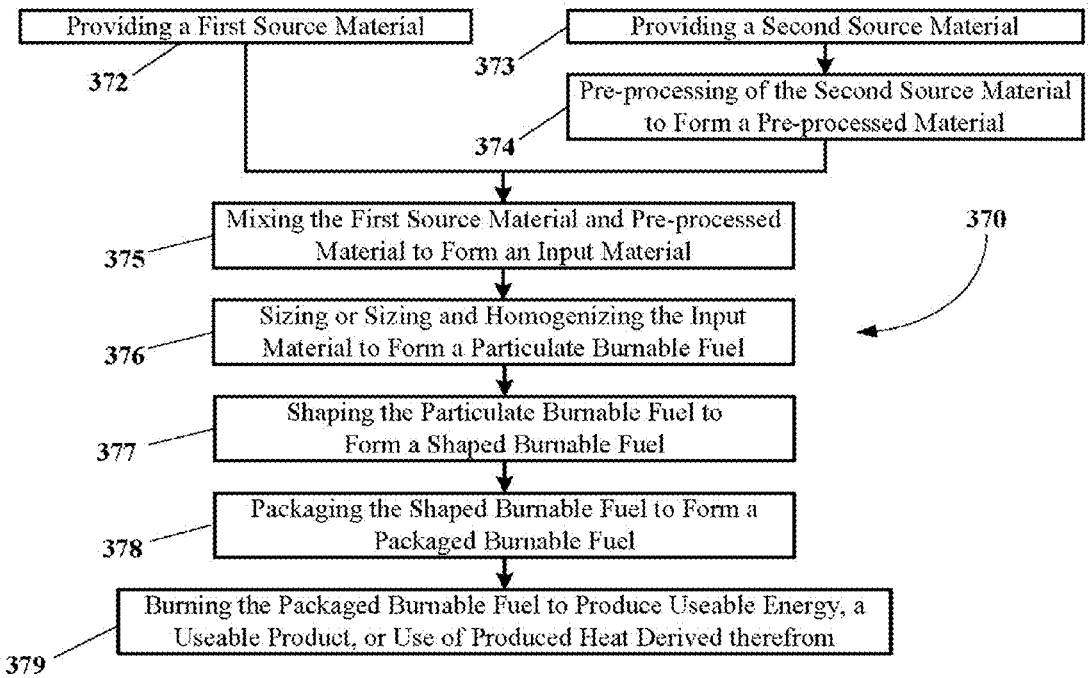

FIG. 3H depicts another embodiment of conceptual flow diagram of a method of this invention.

Basic Systems

Figure 4A:
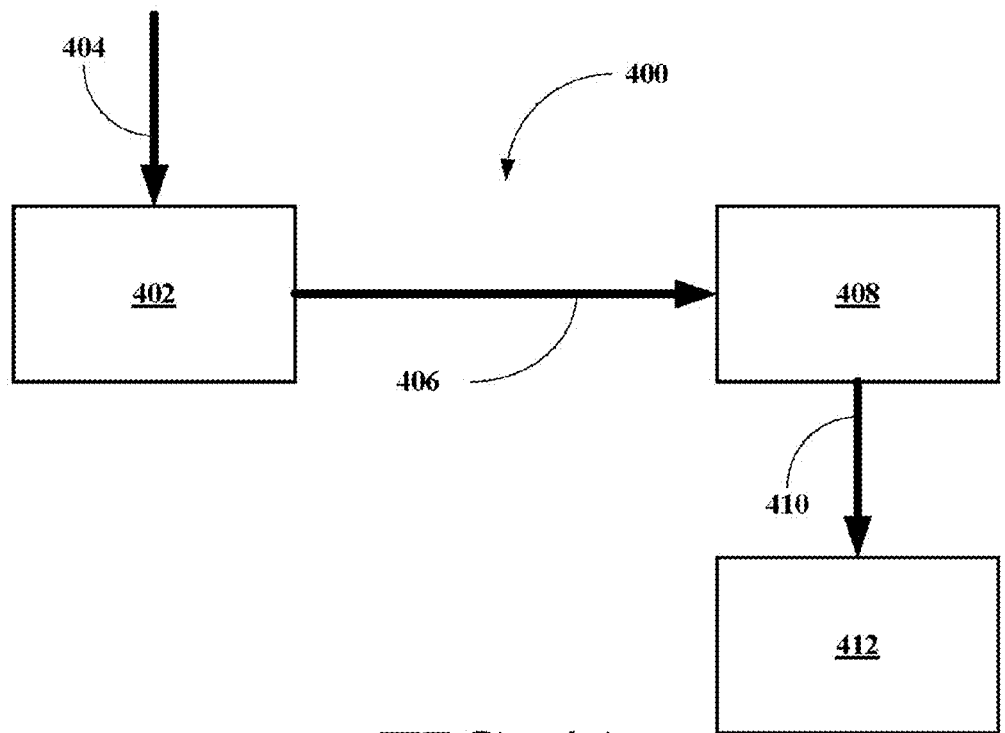

FIG. 4A depicts an embodiment of a system of this invention.

Figure 4B:
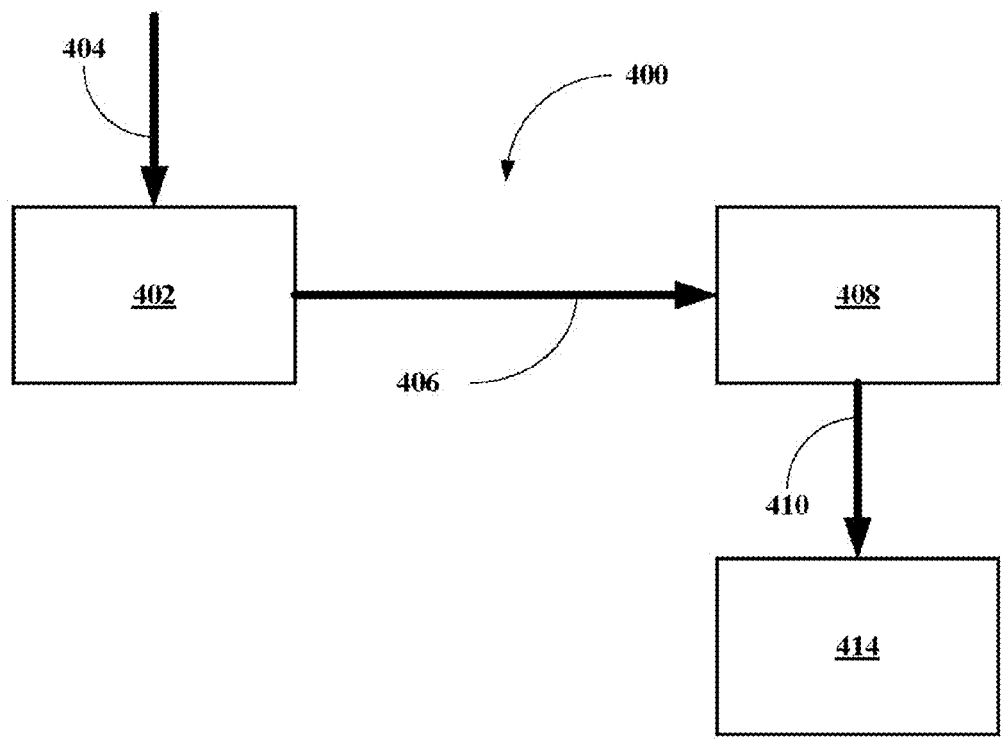

FIG. 4B depicts another embodiment of a system of this invention.

Figure 4C:
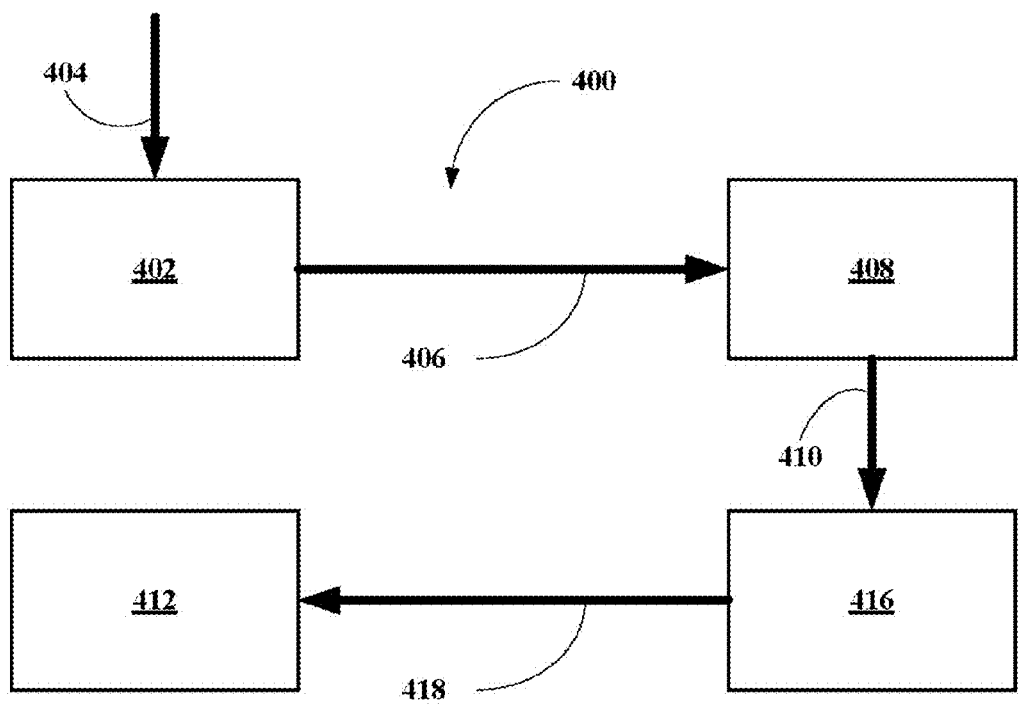

FIG. 4C depicts another embodiment of a system of this invention.

Figure 4D:
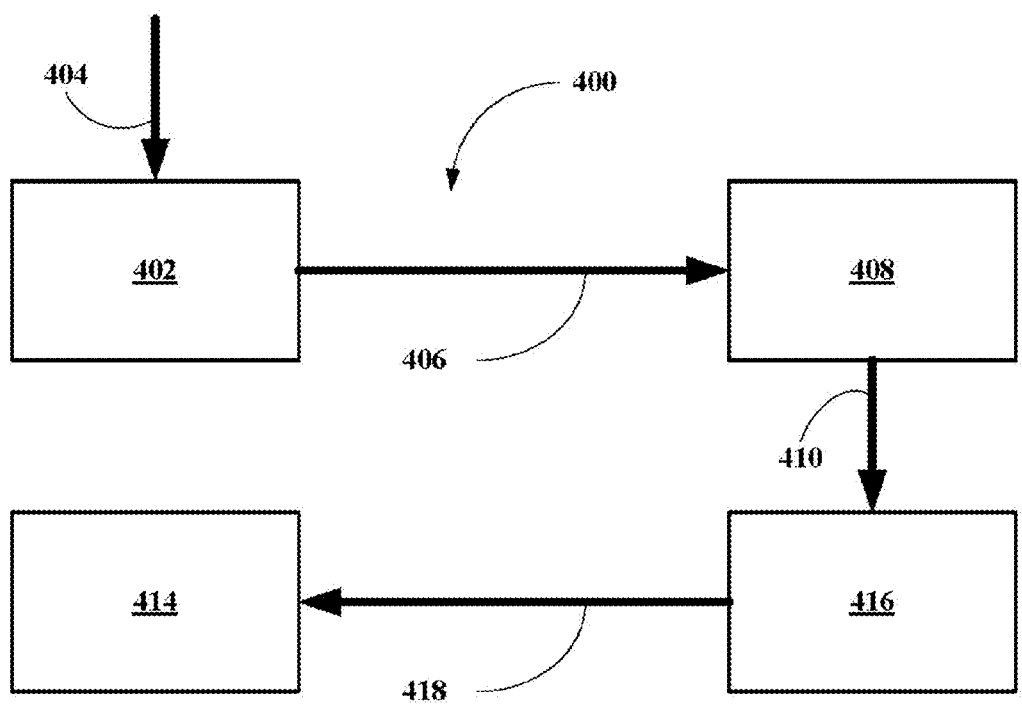

FIG. 4D depicts another embodiment of a system of this invention.

Figure 4E:
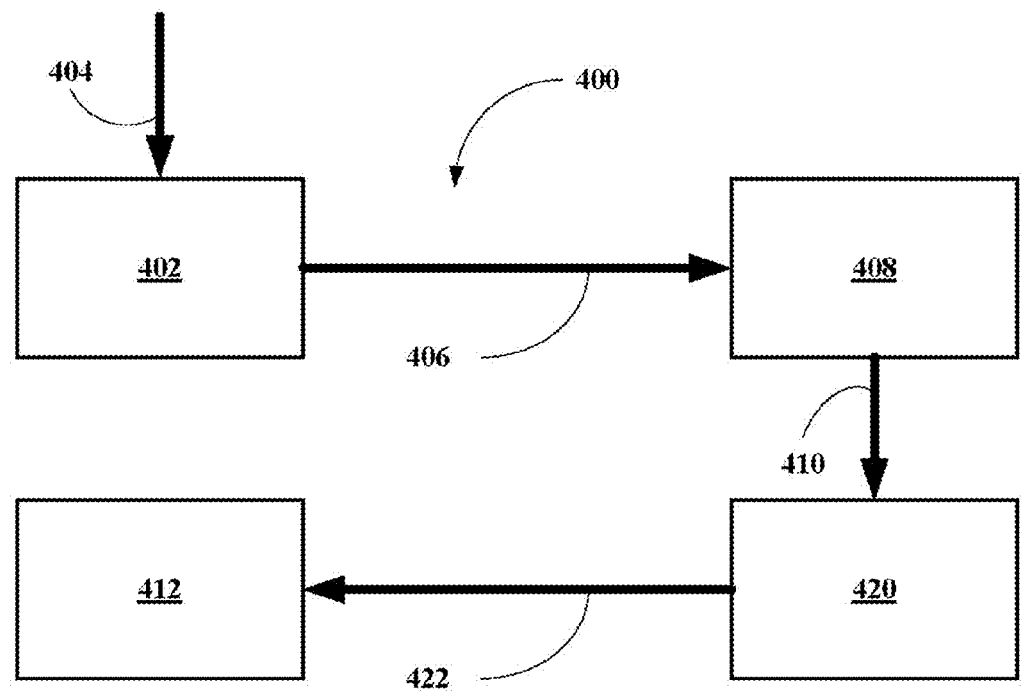

FIG. 4E depicts another embodiment of a system of this invention.

Figure 4F:
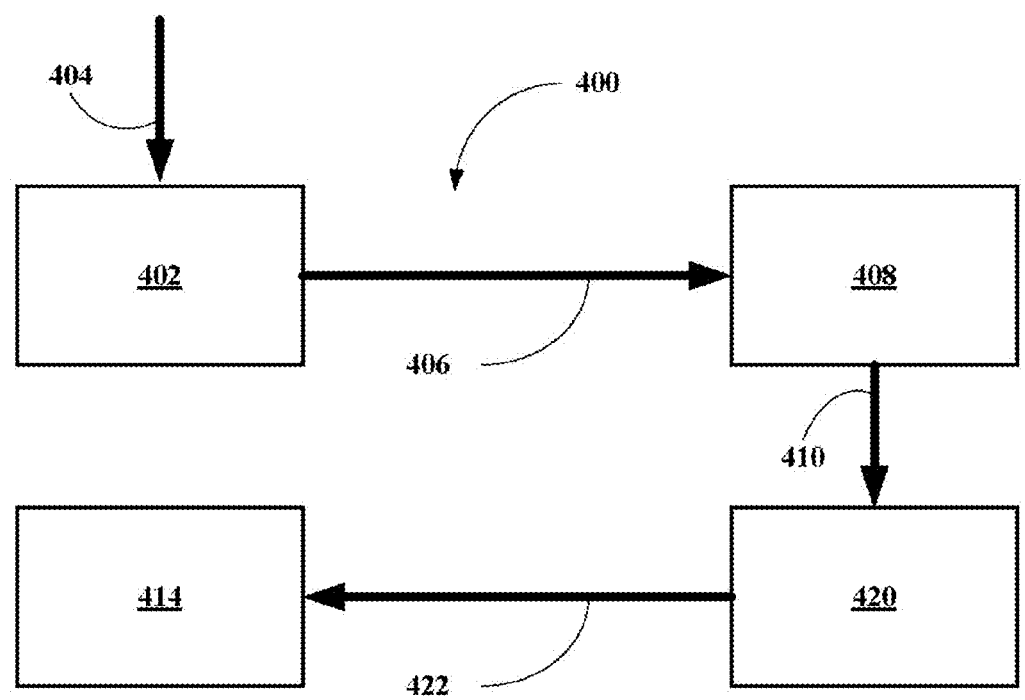

FIG. 4F depicts another embodiment of a system of this invention.

Figure 4G:
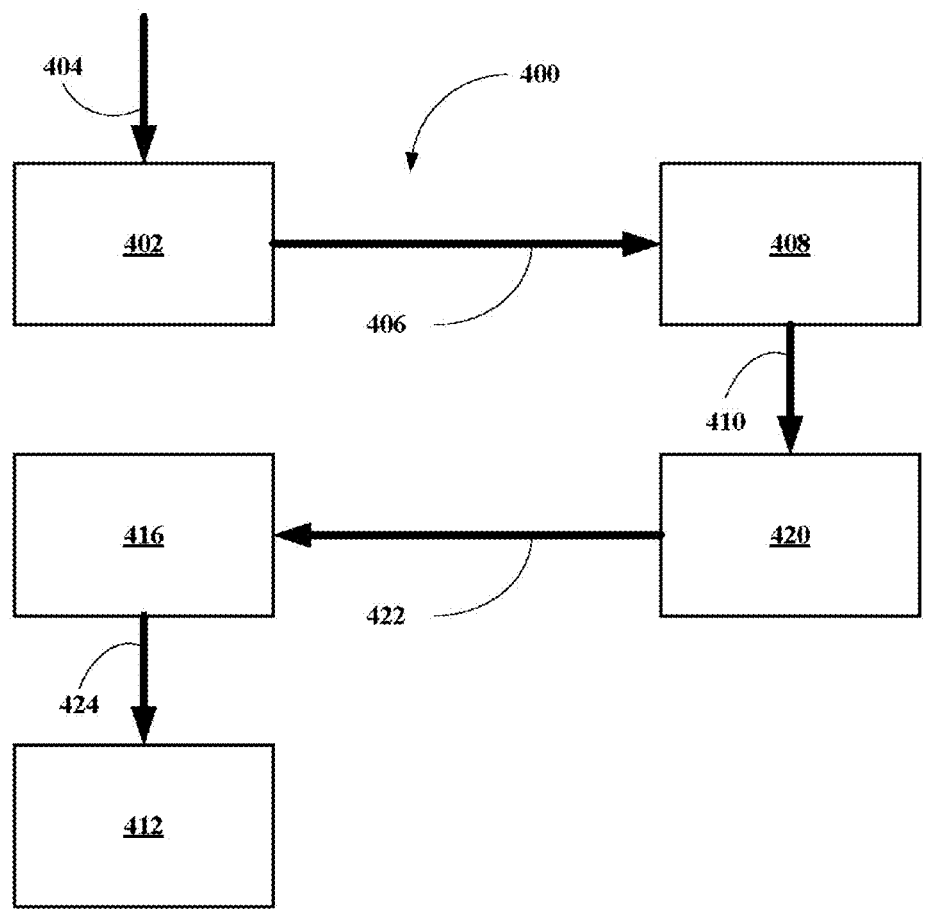

FIG. 4G depicts another embodiment of a system of this invention.

Figure 4H:
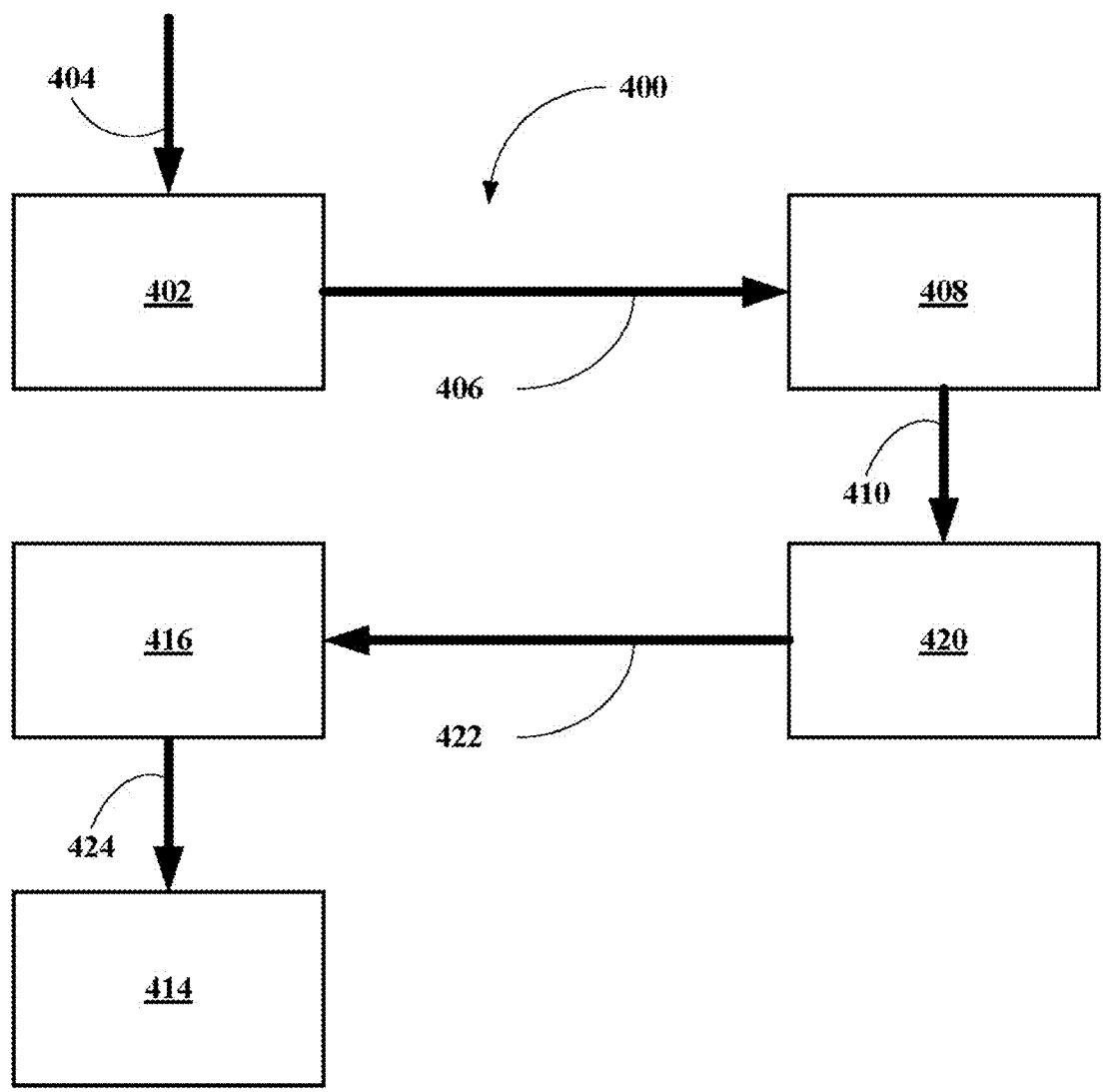

FIG. 4H depicts another embodiment of a system of this invention.

Systems with Pre-Processing Subsystem

Figure 5A:
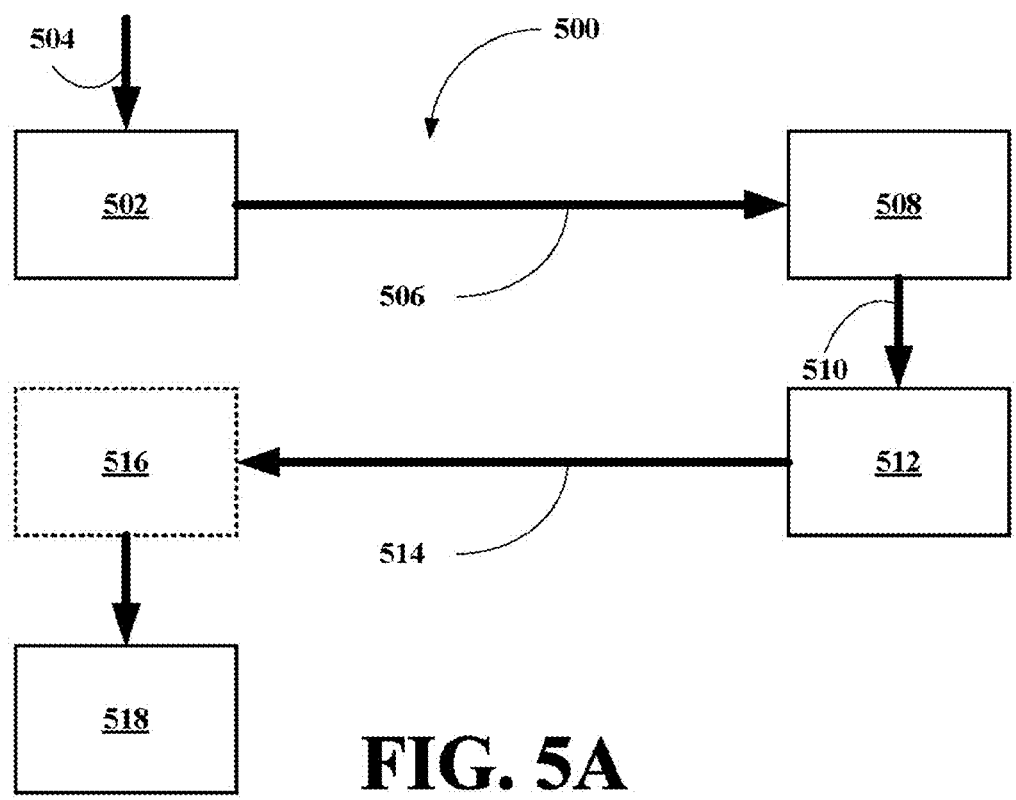

FIG. 5A depicts another embodiment of a system of this invention.

Figure 5B:
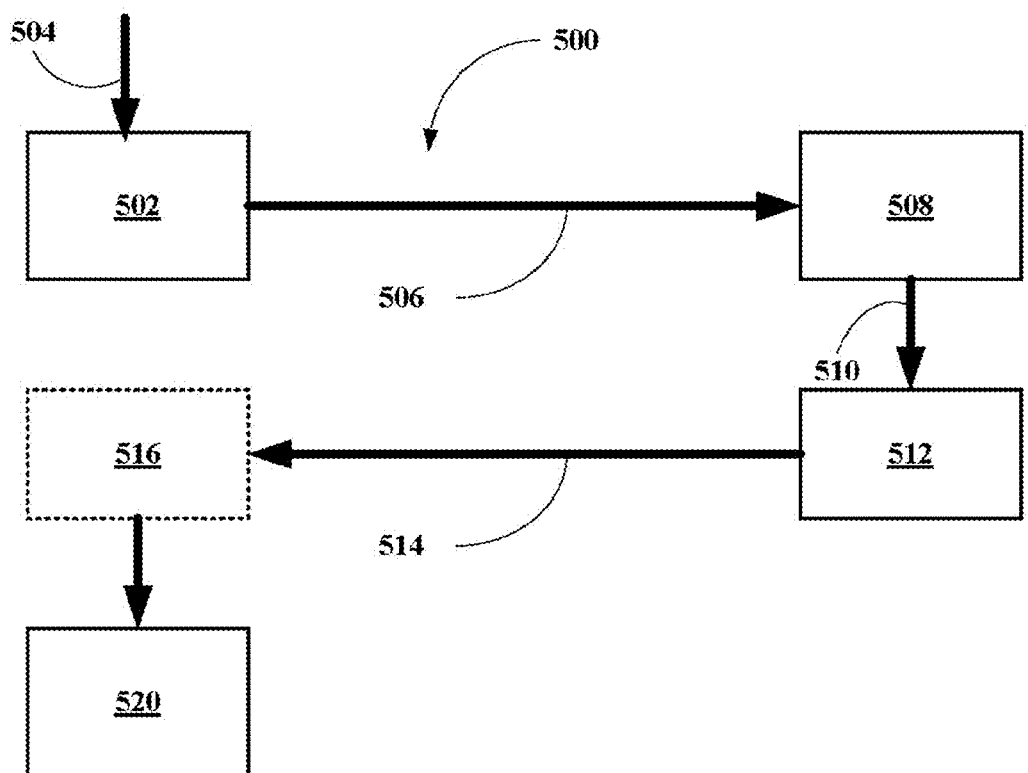

FIG. 5B depicts another embodiment of a system of this invention.

Figure 5C:
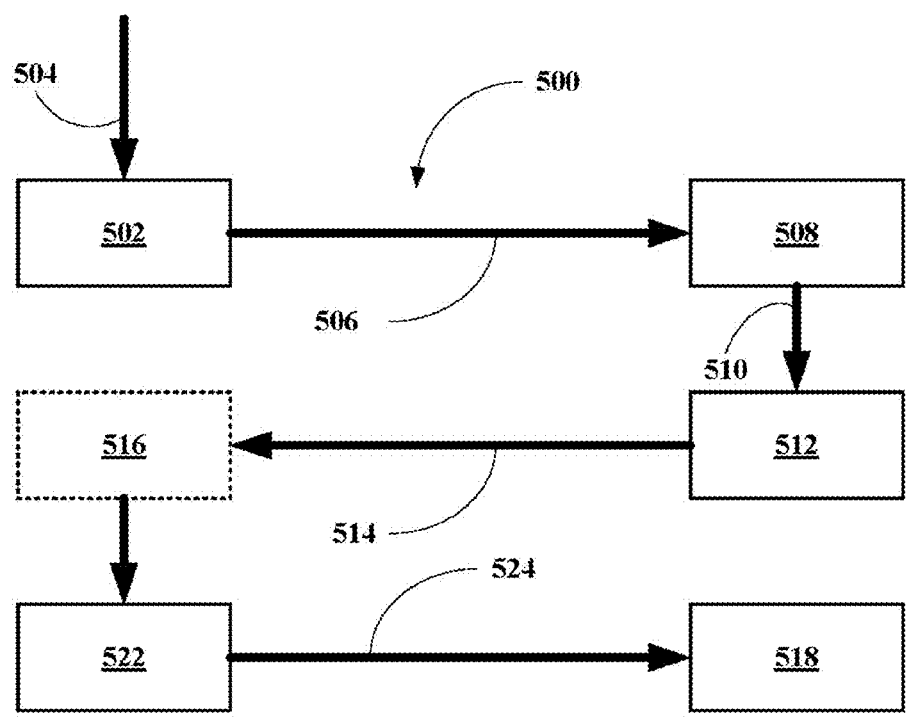

FIG. 5C depicts another embodiment of a system of this invention.

Figure 5D:
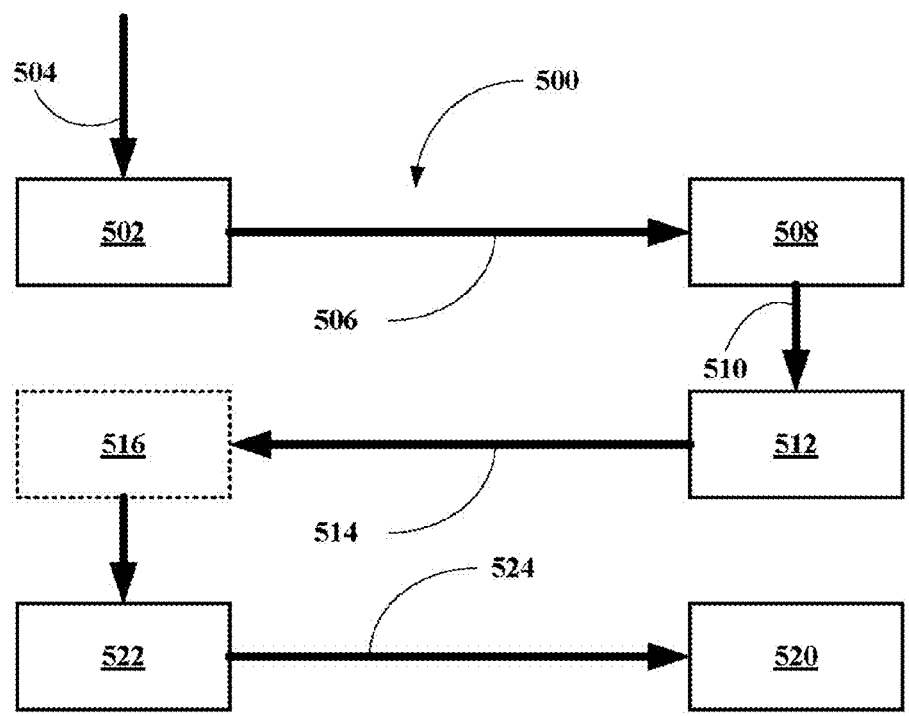

FIG. 5D depicts another embodiment of a system of this invention.

Figure 5E:
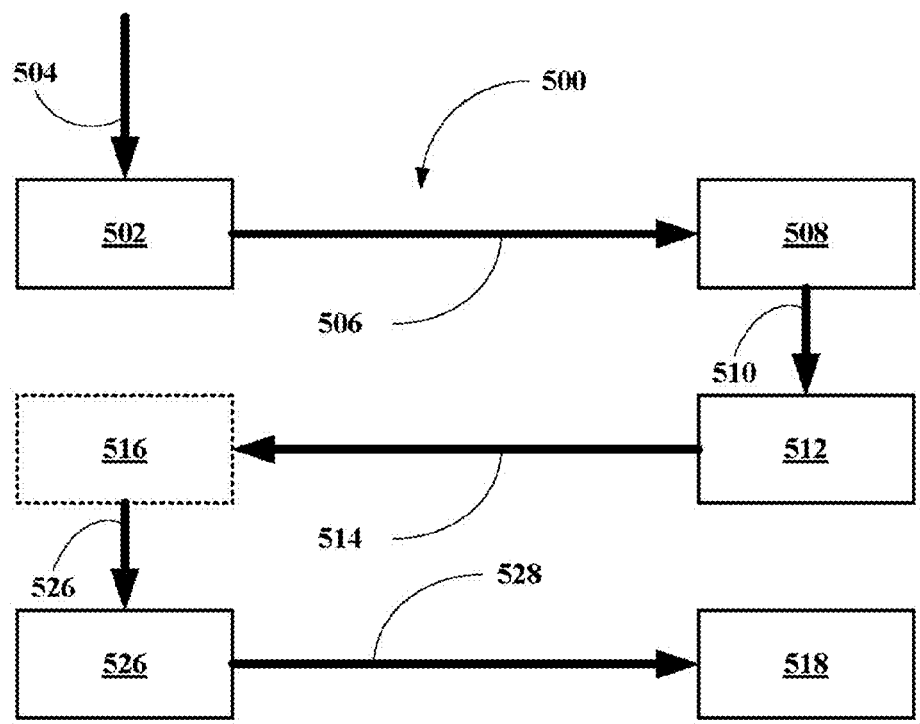

FIG. 5E depicts another embodiment of a system of this invention.

Figure 5F:
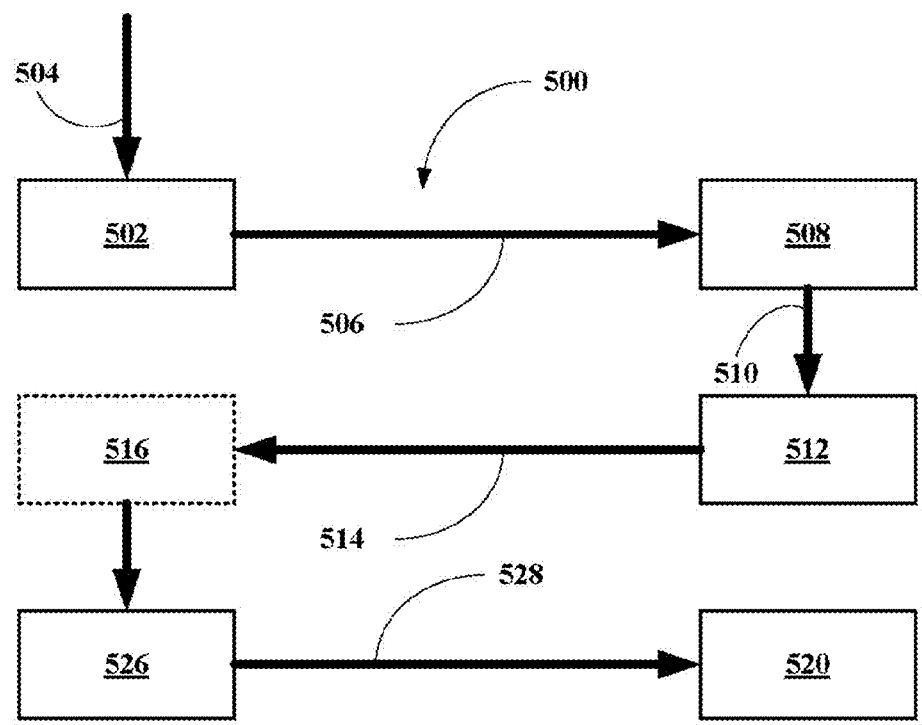

FIG. 5F depicts another embodiment of a system of this invention.

Figure 5G:
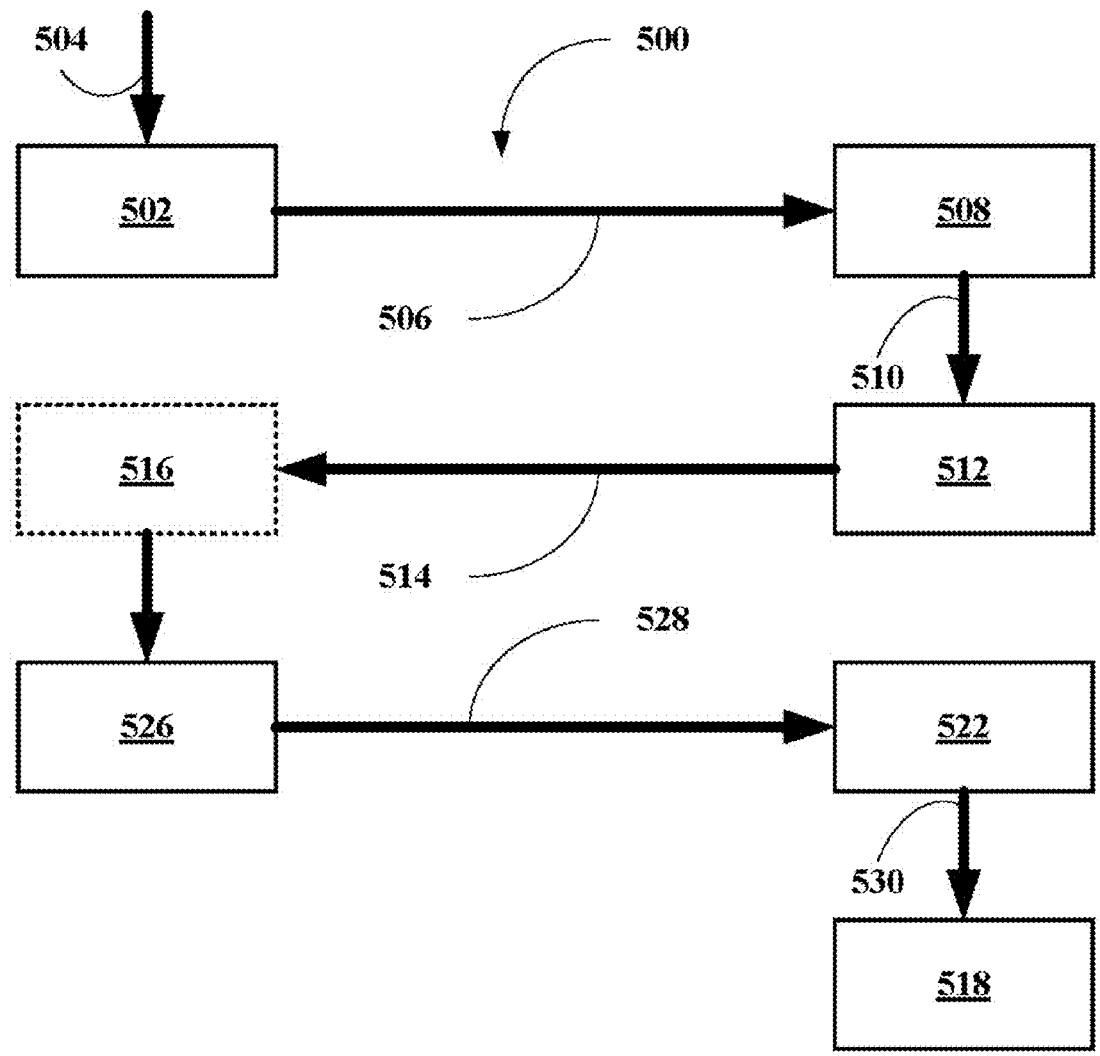

FIG. 5G depicts another embodiment of a system of this invention.

Figure 5H:
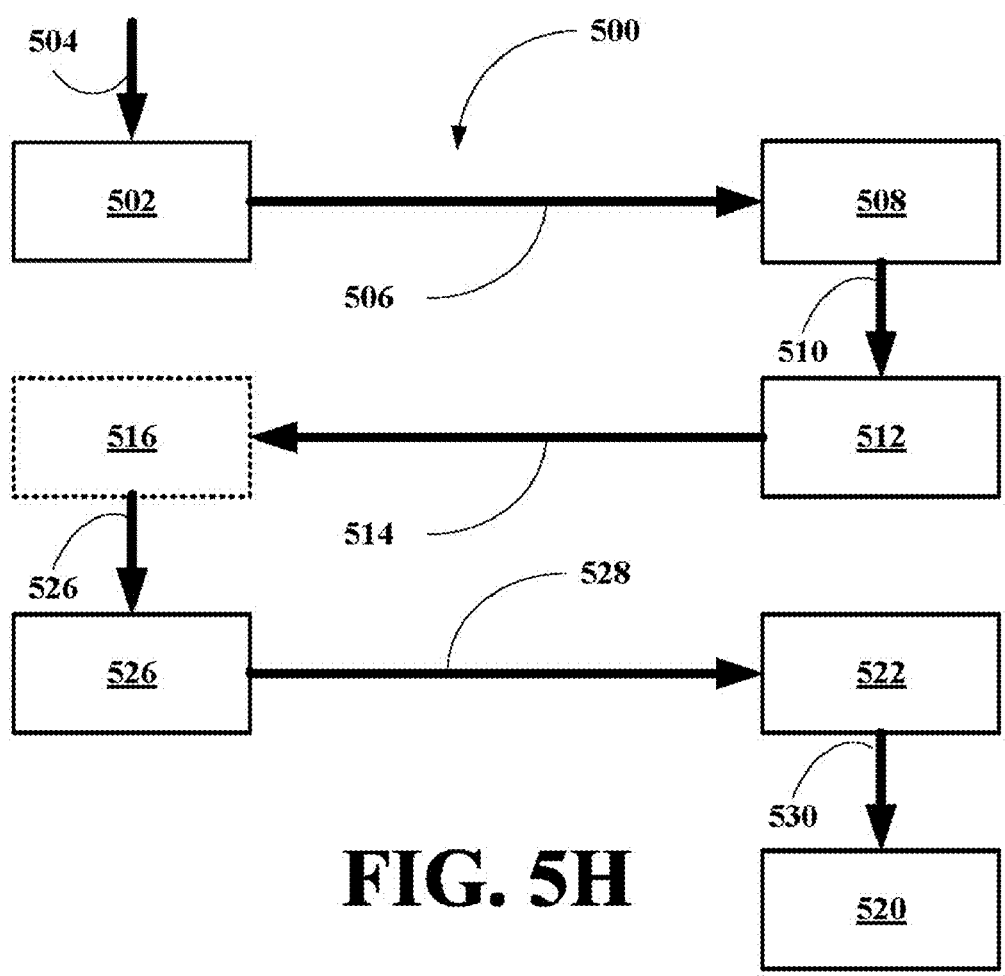

FIG. 5H depicts another embodiment of a system of this invention.

Product Images

FIG. 6 depicts an image of a particulate burnable fuel of this invention.

Figure 7:

FIG. 7 depicts an image of a shaped burnable fuel of this invention.

Figure 8:

FIG. 8 depicts the burnable pelletized fuel.

DETAILED DESCRIPTION OF THE INVENTION

The inventors have found that a method can be implemented for making a burnable fuel from one or a plurality used or waste materials, each material including a complex mixture of components, without the need for exhaustive component separation, where the components include pulp materials, fiber materials, fabric materials, polymer materials, metal materials, ceramic materials, ash materials, and/or other waste materials. The resulting burnable fuel can be formulated for use as a suitable fuel in a number of different industries including cement plants, power plants, municipal incinerators for steam generation, or any other facility that burns fuels and converts heat derived from the burning of the fuel into a usable form of energy such as electrical energy, mechanical energy, chemical energy, etc. or uses the heat and ash to make an end product such as cement.

Embodiments of this invention relate to a method for converting one or a plurality used or waste materials, each material can include a complex mixture of components and where the components can include pulp materials, fiber materials, fabric materials, polymer materials, metal materials, ceramic materials, ash materials, and/or other waste materials directly into a burnable fuel, without the need for exhaustive component separation. The method includes providing an input material comprising a waste or used material or a mixture of waste or used materials having a desired distribution of components. The method also includes sizing or sizing and partially or completely homogenizing the input material to form a sized or sized and partially or completely homogenized particulate burnable fuel.

Embodiments of this invention relate to a method for converting one or a plurality used or waste materials, each material can include a complex mixture of components and where the components can include pulp materials, fiber materials, fabric materials, polymer materials, metal materials, ceramic materials, ash materials, and/or other waste materials directly into a burnable fuel, without the need for exhaustive component separation. The method includes providing an input material comprising a waste material or a mixture of waste materials having a desired distribution of components. The method also includes one or more pre-treating steps to form a pre-treated material. The method also includes sizing or sizing and partially or completely homogenizing the pre-treated material to form a sized or sized and partially or completely homogenized particulate burnable fuel. The method also includes pre-treating or pre-processing the particulate burnable fuel.

Embodiments of this invention relate to a method for converting one or a plurality used or waste materials, each material can include a complex mixture of components and where the components can include pulp materials, fiber materials, fabric materials, polymer materials, metal materials, ceramic materials, ash materials, and/or other waste materials directly into a burnable fuel, without the need for exhaustive component separation. The method includes providing an input material comprising a waste material or a mixture of waste materials having a desired distribution of components. The method also includes disinfecting and/or partially or completely sterilizing some or all of the input material to form a disinfected material. The method can optionally include other pre-treating steps to further condition the input material. These pre-treating step can occur before the disinfecting step or after the disinfecting step. The method also includes sizing or sizing and partially or completely homogenizing the disinfected material to form a sized or sized and partially or completely homogenized particulate burnable fuel. The method also includes pre-treating or pre-processing the particulate burnable fuel.

Embodiments of this invention relate to a method for converting one or a plurality of used or waste materials, each material including a complex mixture of components and where the components can include pulp materials, fiber materials, fabric materials, polymer materials, metal materials, ceramic materials, ash materials, and/or other waste materials directly into a burnable fuel, without the need for exhaustive component separation. The method includes providing an input material comprising a waste material or a mixture of waste materials having a desired distribution of components. The method also optionally includes one or more pre-treating steps to pre-treat the input material to affect a desired alteration in the properties of the input material. The method also includes sizing or sizing and partially or completely homogenizing the input or pre-treated input material to form a sized or sized and partially or completely homogenized particulate burnable fuel. The method also includes shaping the particulate burnable fuel into a compact shaped burnable fuel. The method also includes pre-treating or pre-processing the particulate burnable fuel.

Embodiments of this invention relate to a system for converting one or a plurality of used or waste materials into a burnable fuel. The system includes sources of used or waste materials. The system includes a unit for forming an input material having a desired distribution of waste materials. The system can also include one or more pre-treating units for pre-treating all or some of the input materials or waste materials making up the input material. The input or pre-treated input material is then sized or sized and partially or completely homogenized in a sizing subsystem including a shredding unit, chopping unit, a milling unit, and/or any other unit that reduces the size of the input or pre-treated input material to form a particulate burnable fuel. The particulate burnable fuel can then be packaged or containerized for ease of transport and use. The system can also include a shaping subsystem, where the particulate burnable fuel is compressed, formed or shaped into a shaped burnable fuel for ease of shipping and handling. Each waste material generally includes a complex mixture of components including pulp materials, fiber materials, fabric materials, polymer materials, metal materials, ceramic materials, ash materials, and/or other waste materials or mixtures or combinations thereof. The system can also include one or more pre-treating or pre-processing units for pre-treating or pre-processing all or some of the particulate burnable fuel.

Embodiments of this invention provide burnable fuels including a complex mixture of components derived from one or a plurality of used or waste materials, each material includes a complex mixture of components including pulp materials, fiber materials, fabric materials, polymer materials, metal materials, ceramic materials, ash materials, and/or other waste materials. The fuels can be formed into a compact shape such as a pellet or other compact shape for ease of handling and shipping. In certain embodiments, the fuel includes an effective amount of a binding agent to aid in the shaping process. In certain embodiments, the fuel includes an effective amount of a conventional solid or liquid fuel to alter a flash point, fuel value, or a fuel composition.

Embodiments of this invention provide a method for making a pre-treated waste material for use in forming the input material of this invention, where the method includes receiving a waste material contained in a closed receptacle delivered either through the mail or via other delivery agencies. The closed receptacles are either disinfected and/or partially or completely sterilized as is to form a disinfected material or burned as is to form an ash, where the ash may have an un-utilized fuel value. If disinfected material, the disinfected material becomes a portion of the input material. If burned, the ash becomes a portion of the input material.

Suitable Reagents and Equipment of the Invention

Suitable used or waste materials include, without limitation, any used or waste material. Exemplary examples of used or waste materials include, without limitation, used or waste industrial materials, used or waste municipal materials, used or waste healthcare materials, used or waste medical materials, used or waste agricultural materials, used or waste biomass materials, used or waste electronic materials, used or waste metal materials, or mixtures or combinations thereof. Used or waste healthcare and used or waste medical waste can include medical waste, generated by people, doctors, doctor offices, clinics, emergency clinics, hospitals, dentists, dentistry clinics and hospitals, veterinarians, veterinary clinics and hospitals, farms, farmer, ranches, ranchers, or producers of used or waste material and/or other facilities that produce used or waste material. These used or waste materials are generally complex mixtures of components including, without limitation, pulp materials, fiber materials, fabric materials, polymer materials, metal materials, ceramic materials, ash materials, other materials and/or mixtures or combinations thereof.

Pulp materials suitable for use herein include, without limitation, wood, wood chips, sawdust, paper, cardboard, and/or mixtures or combinations thereof.

Fiber materials suitable for use herein include, without limitation, natural fibers, synthetic fibers, or the like and mixtures or combinations thereof. Exemplary fibers include, without limitation, inorganic fibers, carbon fibers, boron-nitride fibers, organic fibers, ceramic fibers, glass fibers, any other fibrous material and mixtures or combinations thereof.

Fabric materials suitable for use herein include, without limitation, any natural or synthetic fabric and mixtures or combinations thereof. Exemplary examples include, without limitation, cotton, wool and other fabrics made from animals or plants, RAYON, DACRON, fabric made of polyamides, or any other fabric or mixtures or combinations thereof.

The metal or metallic materials include, without limitation, any metal or metal alloy including a metal from the periodic table of elements. Exemplary examples include, alkali metals (Group 1 metals), alkaline earth metals (Group 2 metals), transition metals (Group 3-12 metals), Lanthanide metals, Actinide metals, post-transition metals, metalloids, or mixtures or combinations thereof. Certain metals and metalloids may be removed prior to use depending on the use to which the burnable fuels is put. The metals can be in any form include fibers, pieces, devices including metals, etc. and mixtures or combinations thereof. Exemplary examples include waste electronic devices. Of course, it should be recognized to one of ordinary skill in the art, that certain metals and metal alloys either pose a health or environmental concerns or issue or process concern or issues. Exemplary examples of such metals or metal alloys would include mercury, cadmium, lead, and thallium and radioactive elements and/or isotopes.

Ceramic materials suitable for use herein include, without limitation, any ceramic material or ceramic containing material or mixtures or combinations thereof. Exemplary examples include, without limitation, electronic substrates, glass, dishes, clay pots, any other object that contains a ceramic material, and mixtures or combinations thereof.

The polymer materials suitable for use herein include, without limitation, plastics, thermoplastics, elastomers, thermoplastic elastomers, resins, and other polymer or polymeric materials and/or mixtures or combinations thereof.

Agricultural materials suitable for use herein include, without limitation, any agricultural waste, any agricultural packaging material and mixtures or combinations thereof.

Biomass materials suitable for use herein include, without limitation, any plant matter that is left over after processing to produce an end product such as sugar cane and sugar beet processing, and mixtures or combination thereof.

Other materials can include, without limitation, chemicals, ash, pharmaceuticals (e.g., unused pharmaceuticals, expired pharmaceuticals, or any other pharmaceutical compostions), ceramics, binding agents, composites materials of one or more of the components set forth above, any other materials and/or mixtures or combinations thereof. The inventors have also found that ash derived from incinerating certain used or waste materials, where the ash still has material or fuel value can be added to the material to change or augment a compositional makeup of the fuel.

In all of the mixtures, polymer materials from other sources of waste, unused and/or virgin polymer materials can be added as binding agents to the material before burning or before forming the material into a desired compact shape followed by combustion of the fuel. The inventors believe that polymer materials act as binders in the shaping process, e.g., pelletizing, and help to increase the combustible nature of the resulting fuel.

The used or waste material can include any mixture or combination of any of the above identified materials.

Suitable virgin and/or unused materials can be any material that has not been used and is added to the input material to change a property of the resulting fuel including altering a fuel value of the material, altering an ash composition of the material, expired pharmaceuticals, altering a fluidity of the material, altering a bulk density of the material, altering the cohesiveness of the material, altering the wettability of the material, or altering other properties or two or more properties of the material or mixtures or combinations thereof.

Suitable container or packaging include, without limitation, boxes, barrels, sacks, other containers, or mixtures or combinations thereof.

Suitable disinfecting and/or partially or completely sterilizing equipment include, without limitation, any equipment that can disinfect, and/or partially or completely sterilize used or waste material such as autoclaves including those manufactured by OnSite Sterilization, LLC of Pottstown, Pa., chemical treatments, thermal treatments, radiant treatments, radiological treatments, or any combination thereof.

Suitable pre-treating equipment includes, without limitation, heating units, vaporizing units, pyrolyzing units, washing units (water or solvent), cracking units, cooling units, magnetic separation units, electrolysis units, air floatation units, screening units, segregating units, sedimentation units, fracturing units, shredding units, ultrasonic units, disinfecting units, sterilizing units, chemical treating units, neutralizing units, quality control units, cryogenic units, condensing units, polymerizing units, and mixtures or combinations.

Suitable sizing and homogenizing equipment includes, without limitation, shredders, grinders, choppers, hammer mills, ball mills, or any other equipment used to reduce the physical size of a complex material or any combination of these equipment in series, parallel or a combination thereof. Shedders including those manufactured by SSI Shredding Systems, Inc. of Wilsonville, Oreg.

Suitable shaping equipment includes, without limitation, pelletizes such as those manufactured by Roskamp Champion of Waterloo, Iowa or California Pellet Mill Co. of Crawfordsville, Ind., extruders, other compressing forming equipment or any combination thereof.

Suitable incinerator equipment include, without limitation, any incinerator equipment, pyrolysis treatments, plasma treatments, or other treatments that can burn or combust a used or waste material to an ash, having a given un-used fuel value from 0 to some finite value. Exemplary examples include CONSUMAT® Incinerators manufactured by Consutech Systems, LLC (CONSUMAT is a registered trademark of Consutech Systems, LLC).

Suitable fuel utilization equipment include, without limitation, cement plants, lime plants, brick plants, power plants, municipal incinerators for steam generation, or any other facility that burn fuels and converts heat derived from the burning of the fuel into a usable form of energy or for use of the heat and ash to make an end product or any combination thereof.

For embodiments of the fuels derived from the present invention that are designed to be formed or shaped into a consolidated structure such as a pellet, the used or waste material compositions include an effective amount of binding agents, sufficient to permit the shaping to maintain its final shape. The binding agents are selected from the group consisting of polymer materials or other materials that have a melting or softening temperature between about 40° C. and about 150° C. In certain embodiments, the binding agents are polymer components in used or waste material having a melting or softening temperature between about 40° C. and about 150° C. Exemplary examples of such polymeric materials include, without limitation, modified cellulose, fabrics, plastics, thermoplastics, thermoplastic elastomers, elastomers, fiber enforced resins, metalized or metal coated plastics or polymers, or other polymeric materials and mixtures or combinations thereof. Exemplary plastics and thermoplastics include, without limitation, polyolefins, fluorinated polyolefins, chlorinated polyolefins, polyurethanes, polyalkyleneoxides, polyethers, polyesters, polyamides, polyimides, polycarbonates, epoxy resins, phenolic resins, alkylide resins, polyacrylates, polylactic acid, polyglycolic acid, other biocompatible polymers, and mixtures or combinations thereof. In other embodiments, the bonding agents can include ash alone or in combination with other binding agents. In other embodiments, binding agents can be added to the material to enhance or improve consolidation, to change or alter final ash composition, to reduce or increase metal content, to change or alter consolidated particle properties, to modify or change final particle appearance, or to enhance, improve, alter or change any other final property of the consolidated products of this invention. In specific, materials can be added to the burnable fuel as is, before or after sizing or sizing and shaping to adjust a heat content and/or ash composition of the burnable fuel regardless of its nature or shape.

Used or Waste Material Compositions Useful in the Invention

Embodiments of this invention include a broad distributions of one or a plurality of used or waste materials including used or waste industrial materials, used or waste municipal materials, used or waste healthcare materials, used or waste medical materials, used or waste agricultural materials, used or waste biomass materials, used or waste electronic materials, used or waste metal material, or mixtures or combinations thereof. Each of these materials can include combustible materials and non-combustible materials. Exemplary examples of both combustible and non-combustible materials include, without limitation, pulp materials, fiber materials, fabric materials, polymer materials, metal materials, ceramic materials, ash materials, and/or other waste materials. Depending on their use, the compositions of this invention can be tailored to meet any desired need. By controlling the relative amount of combustible materials and non-combustible material in the input material, properties of the fuel can be adjusted to a desired value. Such input material properties include, without, limitation, a fuel value, a burn rate, a flow rate, an ash composition, an ash weight, by-product compositions and types, metal concentrations, chlorine and/or bromine concentrations, or any mixture or combination of properties. Other included materials can be used to tailor a composition of the ash being produced as the fuel is being burned. The fuel value can be adjusted up or down by changing the mix of combustible materials present and can be augmented further by adding a conventional fuel to the input material or treated material before or simultaneous with burning of the burnable fuels of this invention.

In certain embodiments of this invention, the input material has a composition including from about 20 wt. % to about 100 wt. % of combustible material, from about 0 wt. % to about 50 wt. % of non-combustible materials including metal materials, from about 0 wt. % to about 50 wt. % of binding agents, and from about 0 wt. % to about 50 wt. % of conventional fuels. In other embodiments, the input material has a composition including from about 50 wt. % to about 100 wt. % of combustible material, from about 0 wt. % to about 20 wt. % of non-combustible materials including metal materials, from about 0 wt. % to about 50 wt. % of binding agents, and from about 0 wt. % to about 50 wt. % of conventional fuels. Lesser and greater amount of each component can be included depending on the intended use of the burnable fuel of this invention.

In certain embodiments, the combustible materials can include from about 0 wt. % to about 100 wt. % of pulp materials, from about 0 wt. % to about 100 wt. % of fiber materials, from about 0 wt. % to about 100 wt. % of fabric materials, from about 0 wt. % to about 100 wt. % polymer materials, from about 0 wt. % to about 100 wt. % of other combustible materials, from about 0 wt. % to about 50 wt. % of binding agents, from about 0 wt. % to about 50 wt. % of conventional fuels, and from about 0 wt. % to about 50 wt. % of ash materials having a non-zero fuel value. The non-combustible materials can be added in any amount to alter one or more properties of the resulting burnable fuel.

In other embodiments, the combustible materials can include from about 0 wt. % to about 100 wt. % of pulp materials, from about 0 wt. % to about 100 wt. % of fiber materials, from about 0 wt. % to about 100 wt. % of fabric materials, from about 20 wt. % to about 100 wt. % polymer materials, from about 0 wt. % to about 100 wt. % of other combustible materials, from about 0 wt. % to about 50 wt. % of binding agents, from about 0 wt. % to about 50 wt. % of conventional fuels, and from about 0 wt. % to about 50 wt. % of ash materials having a non-zero fuel value. The non-combustible materials can be added in any amount to alter one or more properties of the resulting burnable fuel.

In other embodiments, the combustible materials can include from about 10 wt. % to about 100 wt. % of pulp materials, from about 10 wt. % to about 100 wt. % of fiber materials, from about 10 wt. % to about 100 wt. % of fabric materials, from about 30 wt. % to about 100 wt. % polymer materials, from about 10 wt. % to about 100 wt. % of other combustible materials, from about 0 wt. % to about 50 wt. % of binding agents, from about 0 wt. % to about 50 wt. % of conventional fuels, and from about 10 wt. % to about 50 wt. % of ash materials having a non-zero fuel value. The non-combustible materials can be added in any amount to alter one or more properties of the resulting burnable fuel.

In other embodiments, the combustible materials can include from about 20 wt. % to about 100 wt. % of pulp materials, from about 20 wt. % to about 100 wt. % of fiber materials, from about 20 wt. % to about 100 wt. % of fabric materials, from about 50 wt. % to about 100 wt. % polymer materials, from about 20 wt. % to about 100 wt. % of other combustible materials, from about 0 wt. % to about 50 wt. % of binding agents, from about 0 wt. % to about 50 wt. % of conventional fuels, and from about 20 wt. % to about 50 wt. % of ash materials having a non-zero fuel value. The non-combustible materials can be added in any amount to alter one or more properties of the resulting burnable fuel. As to these broad classes, the present invention relates to compositions including from about 20 wt. % to about 100 wt. % polymer materials, from about 0 wt. % to about 100 wt. % of pulp materials, and from about 0 wt. % to about 10 wt. % metal materials. In other embodiments, the compositions include from about 60 wt. % to about 100 wt. % polymer materials, from about 20 wt. % to about 100 wt. % of pulp materials, and from about 1 wt. % to about 10 wt. % metal materials. In other embodiments, the compositions include from about 70 wt. % to about 100 wt. % polymer materials, from about 15 wt. % to about 70 wt. % of pulp materials, and from about 0 wt. % to about 5 wt. % metal materials. In other embodiments, the compositions include from about 50 wt. % to about 70 wt. % polymer materials, from about 15 wt. % to about 70 wt. % of pulp materials, and from about 0 wt. % to about 5 wt. % metal materials. In these formulations, the weight percentages are not confined to add up to 100%, but are relative amounts on a weight basis of the final composition.

In these formulations, the weight percentages are not confined to add up to 100%, but are relative amounts on a weight basis of the final composition.

To determine the actual percentage in final composition, all of the weight percentages would be added up to give the overall formulation weight, then simple percentages can be determined.

It should be recognized that these ranges are simply a set of component break downs and any other component make up can be used provided that if the composition is to be shaped, there is sufficient polymer material in the material to allow the compressed material to hold its shape under normal handling condition. In certain embodiments, the shaping can be performed with added heat, pressure, irradiation (e.g., electromagnetic radiation, acoustic radiation, ultrasonic radiation, etc.), chemical additives and/or chemical treatments, etc., to increase shape integrity and improve crush strength of the shaped material.

Pre-Treatments

In certain embodiments, some or all of the input material or a material to be included in the input material is pre-treated to augment, change or remove components of a source material. Such pre-treatments can include quality control testing, heating to remove volatile components, washing to remove water soluble components, solvent washing or extraction to remove solvent extractible components, pre-screening to remove materials having a certain size or construction for separate processing, partial pyrolysis to alter properties of the source material, drying to remove water, crushing of large objects into smaller objects for subsequent processing, any other pretreatment designed to condition a particular source material for use as a component in the input material used to produce the burnable fuels of this invention and any combination of these pre-treatments. Such pre-treating or pre-processing includes those set forth above.

Disinfecting Pre-Treatment

In certain embodiments and for certain materials, some or all of the input material or materials that will ultimately be included in the input material is disinfected and/or partially or completely sterilized using any methodology known to render a disinfected material, substantially free of any harmful pathogens. In certain embodiments of this invention, disinfecting and/or partial or complete sterilization is performed via autoclave sterilization. The source used or waste material is placed in an autoclave at a temperature and pressure and for a time sufficient to render a disinfected material, free or substantially free of any harmful pathogens. The temperature is generally greater than at least 121° C., at a pressure of at least 15 psig and for a time of at least 30 minutes. In certain embodiments, the temperature is between about 121° C. and about 150° C., the pressure is between about 15 psig and about 50 psig and for a time between about 30 minutes and 60 minutes. In certain embodiments, the temperature is between about 121° C. and about 125° C., the pressure is between about 15 psig and about 25 psig and for a time between about 30 minutes and 60 minutes. In certain embodiments, the temperature is between about 121° C. and about 123° C., the pressure is between about 15 psig and about 20 psig and for a time between about 30 minutes and 40 minutes. Although specific embodiments have been set forth on temperature, pressure and time, higher temperatures and/or pressures can be used as well as shorter or longer times depending on a desired outcome or property of the disinfected material.

Particle Distribution

The used or waste material, regardless of its make up, is sized or sized and partially or completely homogenized or otherwise processed to reduce the particle size of the material and to form a particulate material having a certain particle size distribution and a certain degree of homogeny. The exact particle size distribution depends on the nature of the sizing or sizing and partially or completely homogenizing equipment used and on the screens or other size exclusion means used to control the particle size of the exiting particulate material and end use needs. The distribution of the present invention includes particles having a smallest dimension of between about 0.1 µm and about 1000 mm. In certain embodiments, the particles have a smallest dimension of between about 1 µm and about 500 mm. In certain embodiments, the particles have a smallest dimension between about 10 µm and about 500 mm. In other embodiments, the particles have a smallest dimension between about 100 µm and about 500 mm. In other embodiments, the particles have a smallest dimension between about 1 mm and about 500 mm. In other embodiments, the particles have a smallest dimension between about 1 mm and about 250 mm. In other embodiments, the particles have a smallest dimension between about 1 mm and about 100 mm. In other embodiments, the particles have a smallest dimension between about 1 mm and about 50 mm. In other embodiments, the particles have a smallest dimension between about 10 mm and about 50 mm. The smallest dimension means that the particles are capable of passing through a screen of a desired screen size. The screen size range between openings of about 12.7 mm to about 50.8 mm. In other embodiments, the screen opening ranges between about 19.05 mm and about 44.45 mm. In other embodiments, the screen opening ranges between about 19.05 and about 38.1 mm.

The term partially homogenized in the context of the present invention means that the particulate material, although being composed of many different material components, has been mixed sufficiently that the bulk composition of components is within about 30% the same throughout the entire particulate material. In certain, embodiments, the partial homogeneity is within 20% or lower. The term completely homogenized in the context of the present invention means that the particulate material, although being composed of many different material components, has been mixed sufficiently that the bulk composition of components is within about 10% the same throughout the entire particulate material. In certain, embodiments, the partial homogeneity is within 5%.

Compressed Shapes

Optionally, the particulate material from the sizing process is then pressed, extruded or similarly processed into a shape to increase the bulk density of the material. The shape can be any shape including a cylindrical shape, a cubical shape, a rectangular solid shape, a spherical shape, an ellipsoidal shape, a tablet shape or any other compact 3D shape. The dimension of these shapes can range between about 0.5 cm and about 20 cm. In certain embodiments, the shape is substantially elongate shape having a diameter less than or equal to its length. The shape can be of a cylindrical type having sharp cut ends or rounded ends depending on the method used to make the elongate shape. Generally, the elongate shapes have a diameter between about 5 mm and about 20 mm and length of about 2 cm to about 10 cm. In certain embodiments, the elongate shape is cylindrical or substantially cylindrical. In other embodiments, the elongate shape has a diameter between about 10 mm and about 20 mm and a length between 3 cm and about 5 cm. In other embodiments, the elongate shape has a diameter between about 10 mm and about 15 mm and a length between 3 cm and about 5 cm. However, the shapes can be larger or smaller depending on end use. In other embodiment, the shape can have a diameter between about 0.5 cm and 20 cm. In other embodiment, the shape can have a diameter between about 0.5 cm and 20 cm and a length between about 0.5 cm and about 20 cm. In other embodiment, the shape can have a length, a width and a height between about 0.5 cm and 20 cm.

DETAILED DESCRIPTION OF THE DRAWINGS

Methods
Basic

Figure 1A:
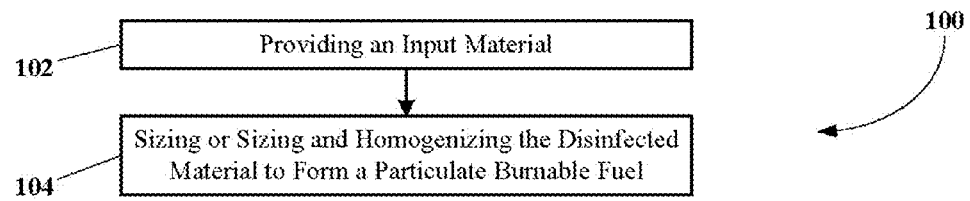
FIG. 1A depicts an embodiment of conceptual flow diagram of a method of this invention.

Referring now to FIG. 1A, an embodiment of the present method, generally 100, is shown to include a providing step 102 for providing an input material having a desired compositions of components. The method also includes a sizing or sizing and partial or complete homogenizing step 104, where the input material is sized or sized and partially or completely homogenized to form a particulate burnable fuel.

Figure 1B:
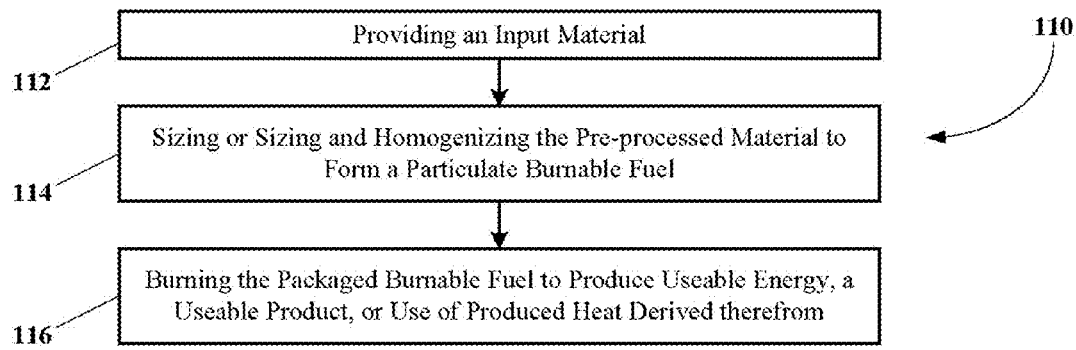
FIG. 1B depicts another embodiment of conceptual flow diagram of a method of this invention.

Referring now to FIG. 1B, an embodiment of the present method, generally 110, is shown to include a providing step 112 of providing an input material having a desired compositions of components. The method also includes a sizing or sizing and homogenizing step 114, where the disinfected material is sized or sized and partially or completely homogenized to form a particulate burnable fuel. The method also includes a burning step 116, where the packaged or containerized, particulate burnable fuel is burned to produce a useable form of energy, to produce a useable product, or to otherwise use the heat derived therefrom.

Figure 1C:
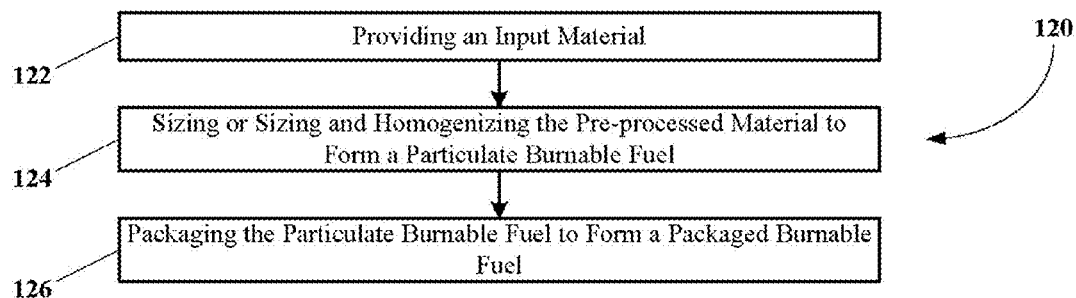
FIG. 1C depicts another embodiment of conceptual flow diagram of a method of this invention.

Referring now to FIG. 1C, an embodiment of the present method, generally 120, is shown to include a providing step 122 for providing an input material having a desired compositions of components. The method also includes a sizing or sizing and homogenizing step 124, where the input material is sized or sized and partially or completely homogenized to form a particulate burnable fuel. The method also includes a packaging step 126, where the burnable fuel is packaged for shipment or transportation to form a packaged or containerized burnable fuel.

Figure 1D:
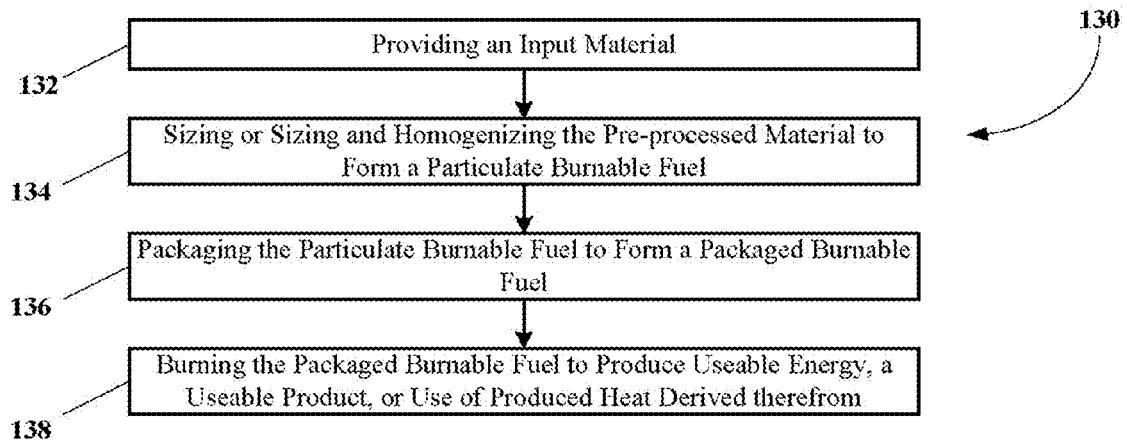
FIG. 1D depicts another embodiment of conceptual flow diagram of a method of this invention.

Referring now to FIG. 1D, an embodiment of the present method, generally 130, is shown to include a providing step 132 for providing an input material having a desired compositions of components. The method also includes a sizing or sizing and homogenizing step 134, where the input material is sized or sized and partially or completely homogenized to form a particulate burnable fuel. The method also includes a packaging step 136, where the burnable fuel is packaged for shipment or transportation to form a packaged or containerized burnable fuel. The method also includes a burning step 138, where the packaged or containerized, particulate burnable fuel is burned to produce a useable form of energy, to produce a useable product, or to otherwise use the heat derived therefrom.

Figure 1E:
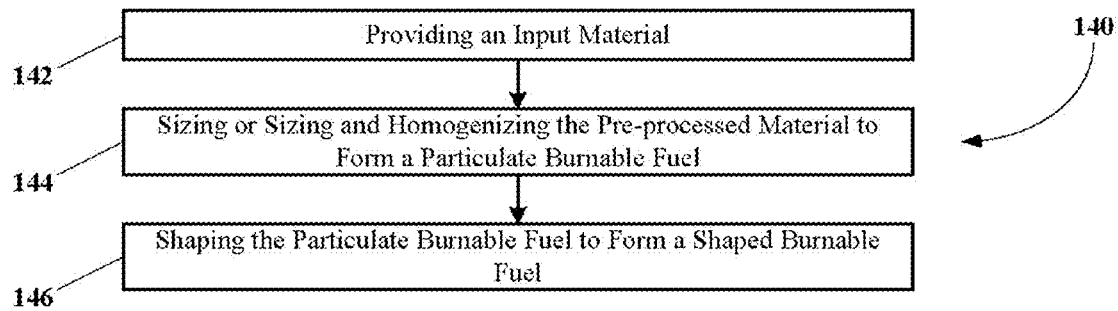
FIG. 1E depicts another embodiment of conceptual flow diagram of a method of this invention.

Referring now to FIG. 1E, an embodiment of the present method, generally 140, is shown to include a providing step 142 for providing an input material having a desired compositions of components. The method also includes a sizing or sizing and homogenizing step 144, where the input material is sized or sized and partially or completely homogenized to form a particulate burnable fuel. The method also includes a shaping step 146, where the particulate burnable fuel is formed into a burnable compact shape. The shaping step can be a pelletizing step, producing burnable fuel pellets, an extruding step, producing burnable extrudates, or any other step that forms the particular burnable fuel into a compact shape.

Figure 1F:
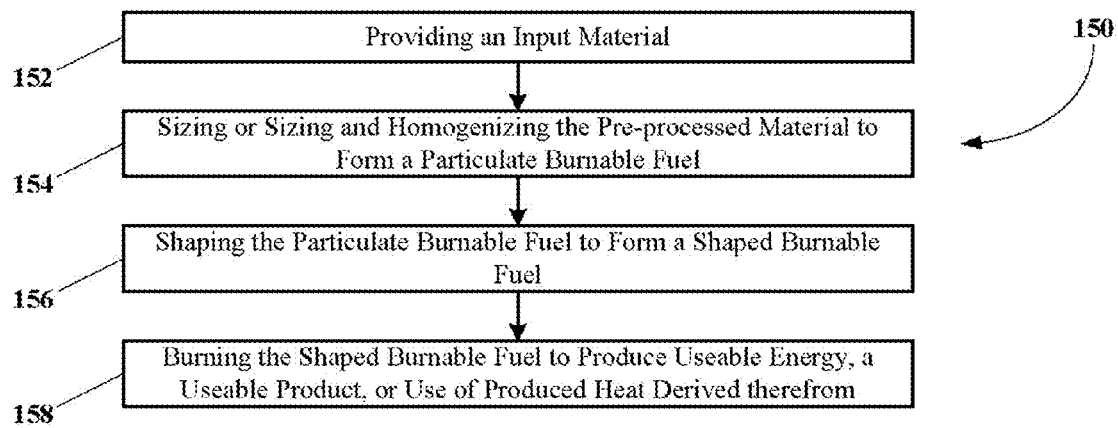
FIG. 1F depicts another embodiment of conceptual flow diagram of a method of this invention.

Referring now to FIG. 1F, an embodiment of the present method, generally 150, is shown to include a providing step 152 for providing an input material having a desired compositions of components. The method also includes a sizing or sizing and homogenizing step 154, where the input material is sized or sized and partially or completely homogenized to form a particulate burnable fuel. The method also includes a shaping step 156, where the particulate burnable fuel is formed into a burnable compact shape. The shaping step can be a pelletizing step, producing burnable fuel pellets, an extruding step, producing burnable extrudates, or any other step that forms the particular burnable fuel into a compact shape. The method also includes a burning step 158, where the shaped burnable fuel is burned to produce a useable form of energy, to produce a useable product, or to otherwise use the heat derived therefrom.

Figure 1G:
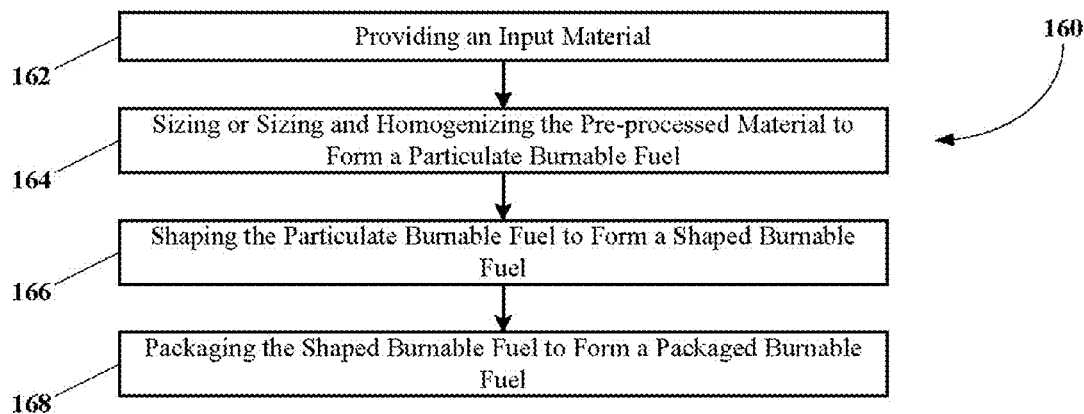
FIG. 1G depicts another embodiment of conceptual flow diagram of a method of this invention.

Referring now to FIG. 1G, an embodiment of the present method, generally 160, is shown to include a providing step 162 for providing an input material having a desired compositions of components. The method also includes a sizing or sizing and homogenizing step 164, where the input material is sized or sized and partially or completely homogenized to form a particulate burnable fuel. The method also includes a shaping step 166, where the particulate burnable fuel is formed into a burnable compact shape. The shaping step can be a pelletizing step, producing burnable fuel pellets, an extruding step, producing burnable extrudates, or any other step that forms the particular burnable fuel into a compact shape. The method also includes a packaging step 168, where the shaped burnable fuel is packaged for shipment or transportation to form a packaged or containerized burnable fuel.

Figure 1H:
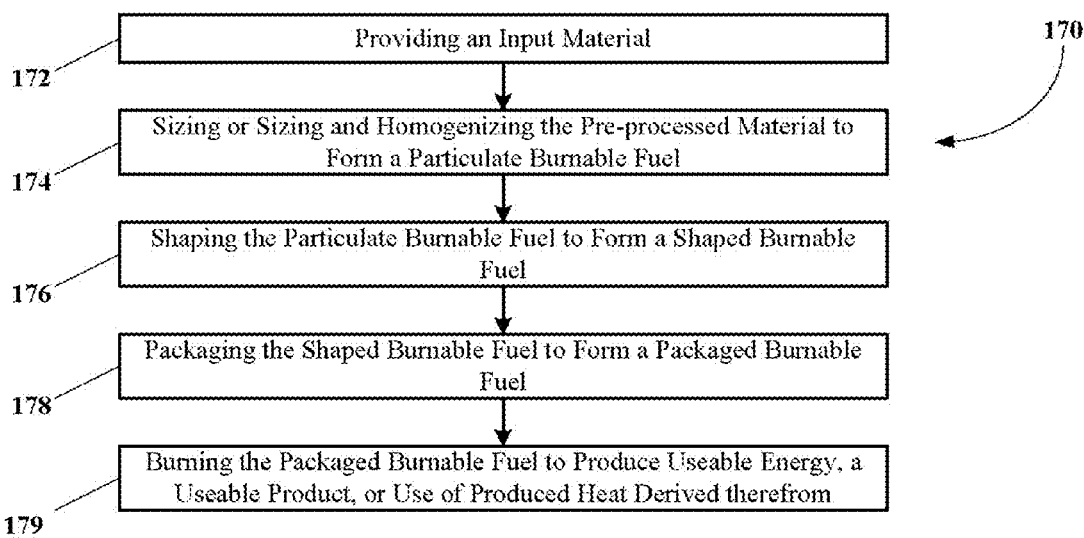
FIG. 1H depicts another embodiment of conceptual flow diagram of a method of this invention.

Referring now to FIG. 1H an embodiment of the present method, generally 170, is shown to include a providing step 172 for providing an input material having a desired compositions of components. The method also includes a sizing or sizing and homogenizing step 174, where the input material is sized or sized and partially or completely homogenized to form a particulate burnable fuel. The method also includes a shaping step 176, where the particulate burnable fuel is formed into a burnable compact shape. The shaping step can be a pelletizing step, producing burnable fuel pellets, an extruding step, producing burnable extrudates, or any other step that forms the particular burnable fuel into a compact shape. The method also includes a packaging step 178, where the burnable fuel is packaged for shipment or transportation to form a packaged or containerized burnable fuel. The method also includes a burning step 179, where the packaged or containerized, shaped burnable fuel is burned to produce a useable form of energy, to produce a useable product, or to otherwise use the heat derived therefrom.

In each of the above methods, the particulate burnable fuel can be pre-processed or pre-treated in one or a plurality of pre-processing or pre-treating steps as shown in FIG. 2A-H.

One Source Material with Pre-Processing

Referring now to FIG. 2A, an embodiment of the present method, generally 200, is shown to include a providing step 202 for providing an input material having a desired compositions of components. The method also includes one or a plurality of input material pre-processing steps 204, where the input material is pre-processed to form a pre-processed input material. The method also includes a sizing or sizing and partially or completely homogenizing step 206, where the pre-processed input material is sized or sized and partially or completely homogenized to form a particulate burnable fuel. The method may also include one or a plurality of particulate burnable fuel pre-processing steps 208, where the particulate burnable fuel is pre-processed or pre-treated.

Referring now to FIG. 2B, an embodiment of the present method, generally 210, is shown to include a providing step 212 for providing an input material having a desired compositions of components. The method also includes one or a plurality of input material pre-processing steps 214, where the input material is pre-processed to form a pre-processed material. The method also includes a sizing or sizing and partially or completely homogenizing step 216, where the pre-processed material is sized or sized and partially or completely homogenized to form a particulate burnable fuel. The method may also include one or a plurality of particulate burnable fuel pre-processing steps 218, where the particulate burnable fuel is pre-processed or pre-treated. The method can also include a packaging step 219, where the burnable fuel is packaged for shipment or transportation to form a packaged or containerized particulate burnable fuel.

Referring now to FIG. 2C, an embodiment of the present method, generally 220, is shown to include a providing step 222 for providing an input material having a desired compositions of components. The method also includes one or a plurality of input material pre-processing steps 224, where the input material is pre-processed to form a pre-processed material. The method also includes a sizing or sizing and partially or completely homogenizing step 226, where the pre-processed material is sized or sized and partially or completely homogenized to form a particulate burnable fuel. The method may also include one or a plurality of particulate burnable fuel pre-processing steps 228, where the particulate burnable fuel is pre-processed or pre-treated. The method also includes a burning step 229, where the packaged or containerized, particulate burnable fuel is burned to produce a useable form of energy, to produce a useable product, or to otherwise use the heat derived therefrom.

Referring now to FIG. 2D, an embodiment of the present method, generally 230, is shown to include a providing step 232 for providing an input material having a desired compositions of components. The method also includes on or a plurality of input material pre-processing steps 234, where the input material is pre-processed to form a pre-processed material. The method also includes a sizing or sizing and partially or completely homogenizing step 236, where the pre-processed material is sized or sized and partially or completely homogenized to form a particulate burnable fuel. The method may also include one or a plurality of particulate burnable fuel pre-processing steps 237, where the particulate burnable fuel is pre-processed or pre-treated. The method can also include a packaging step 238, where the burnable fuel is packaged for shipment or transportation to form a packaged or containerized particulate burnable fuel. The method also includes a burning step 239, where the packaged or containerized, particulate burnable fuel is burned to produce a useable form of energy, to produce a useable product, or to otherwise use the heat derived therefrom.

Referring now to FIG. 2E, an embodiment of the present method, generally 240, is shown to include a providing step 242 for providing an input material having a desired compositions of components. The method also includes on or a plurality of input material pre-processing steps 244, where the input material is pre-processed to form a pre-processed material. The method also includes a sizing or sizing and partially or completely homogenizing step 246, where the pre-processed material is sized or sized and partially or completely homogenized to form a particulate burnable fuel. The method may also include one or a plurality of particulate burnable fuel pre-processing steps 248, where the particulate burnable fuel is pre-processed or pre-treated. The method also includes a shaping step 249, where the particulate burnable fuel is formed into a burnable compact shape. The shaping step can be a pelletizing step, producing burnable fuel pellets, an extruding step, producing burnable extrudates, or any other step that forms the particular burnable fuel into a compact shape.

Referring now to FIG. 2F, an embodiment of the present method, generally 250, is shown to include a providing step 252 for providing an input material having a desired compositions of components. The method also includes on or a plurality of input material pre-processing steps 254, where the input material is pre-processed to form a pre-processed material. The method also includes a sizing or sizing and partially or completely homogenizing step 256, where the pre-processed material is sized or sized and partially or completely homogenized to form a particulate burnable fuel. The method may also include one or a plurality of particulate burnable fuel pre-processing steps 257, where the particulate burnable fuel is pre-processed or pre-treated. The method also includes a shaping step 258, where the particulate burnable fuel is formed into a burnable compact shape. The shaping step can be a pelletizing step, producing burnable fuel pellets, an extruding step, producing burnable extrudates, or any other step that forms the particular burnable fuel into a compact shape. The method can also include a packaging step 259, where the burnable fuel is packaged for shipment or transportation to form a packaged or containerized shaped burnable fuel.

Referring now to FIG. 2G, an embodiment of the present method, generally 260, is shown to include a providing step 262 for providing an input material having a desired compositions of components. The method also includes on or a plurality of input material pre-processing steps 264, where the input material is pre-processed to form a pre-processed material. The method also includes a sizing or sizing and partially or completely homogenizing step 266, where the pre-processed material is sized or sized and partially or completely homogenized to form a particulate burnable fuel. The method may also include one or a plurality of particulate burnable fuel pre-processing steps 267, where the particulate burnable fuel is pre-processed or pre-treated. The method also includes a shaping step 268, where the particulate burnable fuel is formed into a burnable compact shape. The shaping step can be a pelletizing step, producing burnable fuel pellets, an extruding step, producing burnable extrudates, or any other step that forms the particular burnable fuel into a compact shape. The method also includes a burning step 269, where the shaped burnable fuel is burned to produce a useable form of energy, to produce a useable product, or to otherwise use the heat derived therefrom.

Referring now to FIG. 2H, an embodiment of the present method, generally 270, is shown to include a providing step 272 for providing an input material having a desired compositions of components. The method also includes on or a plurality of input material pre-processing steps 274, where the input material is pre-processed to form a pre-processed material. The method also includes a sizing or sizing and partially or completely homogenizing step 275, where the pre-processed material is sized or sized and partially or completely homogenized to form a particulate burnable fuel. The method may also include one or a plurality of particulate burnable fuel pre-processing steps 276, where the particulate burnable fuel is pre-processed or pre-treated. The method also includes a shaping step 277, where the particulate burnable fuel is formed into a burnable compact shape. The shaping step can be a pelletizing step, producing burnable fuel pellets, an extruding step, producing burnable extrudates, or any other step that forms the particular burnable fuel into a compact shape. The method can also include a packaging step 278, where the burnable fuel is packaged for shipment or transportation to form a packaged or containerized particulate burnable fuel. The method also includes a burning step 279, where the packaged or containerized, shaped burnable fuel is burned to produce a useable form of energy, to produce a useable product, or to otherwise use the heat derived therefrom.

Two Source Material, One Pre-Processed

Referring now to FIG. 3A, an embodiment of the present method, generally 300, is shown to include a first providing step 302 for providing a first source material. The method also includes a second providing step 304 for providing a second source material. The method also includes one or more pre-processing steps 306 for pre-processing the second source material to form a pre-processed material. The method also includes a mixing step 308, where the first source material and the pre-processed material are mixed to form an input material having a desired compositions of components. The method also includes a sizing or sizing and homogenizing step 309, where the pre-processed material is sized or sized and partially or completely homogenized to form a particulate burnable fuel. The term source material" refers to any waste or other material, without limitation, which contains fuel and/or material value suitable for the end use.

Referring now to FIG. 3B, an embodiment of the present method, generally 310, is shown to include a first providing step 312 for providing a first source material. The method also includes a second providing step 314 for providing a second source material. The method also includes one or more pre-processing steps 316 for pre-processing the second source material to form a pre-processed material. The method also includes a mixing step 317, where the first source material and the pre-processed material are mixed to form an input material having a desired compositions of components. The method also includes a sizing or sizing and homogenizing step 318, where the pre-processed material is sized or sized and partially or completely homogenized to form a particulate burnable fuel. The method also includes a burning step 319, where the particulate burnable fuel is burned to produce a useable form of energy, to produce a useable product, or to otherwise use the heat derived therefrom. The method can also include one or more pre-processing step for the first source material. These pre-processing steps may be the same or different from the pre-processing steps used to pre-treat the second source material.

Referring now to FIG. 3C, an embodiment of the present method, generally 320, is shown to include a first providing step 322 for providing a first source material. The method also includes a second providing step 324 for providing a second source material. The method also includes one or more pre-processing steps 326 for pre-processing the second source material to form a pre-processed material. The method also includes a mixing step 327, where the first source material and the pre-processed material are mixed to form an input material having a desired compositions of components. The method also includes a sizing or sizing and homogenizing step 328, where the pre-processed material is sized or sized and partially or completely homogenized to form a particulate burnable fuel. The method can also include a packaging step 329, where the burnable fuel is packaged for shipment or transportation to form a packaged or containerized, particulate burnable fuel. The method can also include one or more pre-processing step for the first source material. These pre-processing steps may be the same or different from the pre-processing steps used to pre-treat the second source material.

Referring now to FIG. 3D, an embodiment of the present method, generally 330, is shown to include a first providing step 332 for providing a first source material. The method also includes a second providing step 334 for providing a second source material. The method also includes one or more pre-processing steps 335 for pre-processing the second source material to form a pre-processed material. The method also includes a mixing step 336, where the first source material and the pre-processed material are mixed to form an input material having a desired compositions of components. The method also includes a sizing or sizing and homogenizing step 337, where the pre-processed material is sized or sized and partially or completely homogenized to form a particulate burnable fuel. The method can also include a packaging step 338, where the burnable fuel is packaged for shipment or transportation to form a packaged or containerized, particulate burnable fuel. The method also includes a burning step 339, where the packaged or containerized, particulate burnable fuel is burned to produce a useable form of energy, to produce a useable product, or to otherwise use the heat derived therefrom. The method can also include one or more pre-processing step for the first source material. These pre-processing steps may be the same or different from the pre-processing steps used to pre-treat the second source material.

Referring now to FIG. 3E, an embodiment of the present method, generally 340, is shown to include a first providing step 342 for providing a first source material. The method also includes a second providing step 344 for providing a second source material. The method also includes one or more pre-processing steps 346 for pre-processing the second source material to form a pre-processed material. The method also includes a mixing step 347, where the first source material and the pre-processed material are mixed to form an input material having a desired compositions of components. The method also includes a sizing or sizing and homogenizing step 348, where the pre-processed material is sized or sized and partially or completely homogenized to form a particulate burnable fuel. The method can also include shaping step 349, where the particulate burnable fuel is formed into a burnable compact shape. The shaping step can be a pelletizing step, producing burnable fuel pellets, an extruding step, producing burnable extrudates, or any other step that forms the particular burnable fuel into a compact shape. The method can also include one or more pre-processing step for the first source material. These pre-processing steps may be the same or different from the pre-processing steps used to pre-treat the second source material.

Referring now to FIG. 3F, an embodiment of the present method, generally 350, is shown to include a first providing step 352 for providing a first source material. The method also includes a second providing step 353 for providing a second source material. The method also includes one or more pre-processing steps 354 for pre-processing the second source material to form a pre-processed material. The method also includes a mixing step 355, where the first source material and the pre-processed material are mixed to form an input material having a desired compositions of components. The method also includes a sizing or sizing and homogenizing step 356, where the pre-processed material is sized or sized and partially or completely homogenized to form a particulate burnable fuel. The method can also include shaping step 357, where the particulate burnable fuel is formed into a burnable compact shape. The shaping step can be a pelletizing step, producing burnable fuel pellets, an extruding step, producing burnable extrudates, or any other step that forms the particular burnable fuel into a compact shape. The method also includes a burning step 358, where the shaped burnable fuel is burned to produce a useable form of energy, to produce a useable product, or to otherwise use the heat derived therefrom. The method can also include one or more pre-processing step for the first source material. These pre-processing steps may be the same or different from the pre-processing steps used to pre-treat the second source material.

Referring now to FIG. 3G, an embodiment of the present method, generally 360, is shown to include a first providing step 362 for providing a first source material. The method also includes a second providing step 363 for providing a second source material. The method also includes one or more pre-processing steps 364 for pre-processing the second source material to form a pre-processed material. The method also includes a mixing step 365, where the first source material and the pre-processed material are mixed to form an input material having a desired compositions of components. The method also includes a sizing or sizing and homogenizing step 366, where the pre-processed material is sized or sized and partially or completely homogenized to form a particulate burnable fuel. The method can also include shaping step 367, where the particulate burnable fuel is formed into a burnable compact shape. The shaping step can be a pelletizing step, producing burnable fuel pellets, an extruding step, producing burnable extrudates, or any other step that forms the particular burnable fuel into a compact shape. The method can also include a packaging step 368, where the burnable fuel is packaged for shipment or transportation to form a packaged or containerized, shaped burnable fuel. The method can also include one or more pre-processing step for the first source material. These pre-processing steps may be the same or different from the pre-processing steps used to pre-treat the second source material.

Referring now to FIG. 3H, an embodiment of the present method, generally 370, is shown to include a first providing step 372 for providing a first source material. The method also includes a second providing step 373 for providing a second source material. The method also includes one or more pre-processing steps 374 for pre-processing the second source material to form a pre-processed material. The method also includes a mixing step 375, where the first source material and the pre-processed material are mixed to form an input material having a desired compositions of components. The method also includes a sizing or sizing and homogenizing step 376, where the pre-processed material is sized or sized and partially or completely homogenized to form a particulate burnable fuel. The method can also include shaping step 377, where the particulate burnable fuel is formed into a burnable compact shape. The shaping step can be a pelletizing step, producing burnable fuel pellets, an extruding step, producing burnable extrudates, or any other step that forms the particular burnable fuel into a compact shape. The method can also include a packaging step 378, where the burnable fuel is packaged for shipment or transportation to form a packaged or containerized, shaped burnable fuel. The method also includes a burning step 379, where the shaped burnable fuel is burned to produce a useable form of energy, to produce a useable product, or to otherwise use the heat derived therefrom. The method can also include one or more pre-processing step for the first source material. These pre-processing steps may be the same or different from the pre-processing steps used to pre-treat the second source material.

In each of the above methods, the particulate burnable fuel can be pre-processed or pre-treated in one or a plurality of pre-processing or pre-treating steps as shown in FIG. 2A-H.
Systems
Basic Referring now to FIG. 4A, an embodiment of the present system, generally 400, is shown to include a material supply subsystem 402, where one or a plurality of source materials 404 are collected to form an input material 406 for subsequent system processing. The input material 406 can include a variety of components as described above and can be adjusted to achieve a desired compositional makeup of components. The input material 406 is then sized or sized and partially or completely homogenized in a sizing or sizing and homogenizing subsystem 408, where the input material 406 is shredded, chopped, shattered, or broken to produce a particulate burnable fuel 410 having a desired particle size distribution. The particulate burnable fuel 410 is then forwarded to a storage subsystem 412, where the particulate burnable fuel 410 is stored for subsequent use as a fuel or fuel component.

Referring now to FIG. 4B, an embodiment of the present system, generally 400, is shown to include a material supply subsystem 402, where one or a plurality of source materials 404 are collected to form an input material 406 for subsequent system processing. The input material 406 can include a variety of components as described above and can be adjusted to achieve a desired compositional makeup of components. The input material 406 is then sized or sized and partially or completely homogenized in a sizing or sizing and homogenizing subsystem 408, where the input material 406 is shredded, chopped, shattered, or broken to produce a particulate burnable fuel 410 having a desired particle size distribution. The particulate burnable fuel 410 is then forwarded to a combustion subsystem 414, where a portion of the heat generated by combustion of the particulate burnable fuel 410 is converted into a useable form of energy, into heat and a useable product or into heat for subsequent use.

Referring now to FIG. 4C, an embodiment of the present system, generally 400, is shown to include a material supply subsystem 402, where one or a plurality of source materials 404 are collected to form an input material 406 for subsequent system processing. The input material 406 can include a variety of components as described above and can be adjusted to achieve a desired compositional makeup of components. The input material 406 is then sized or sized and partially or completely homogenized in a sizing or sizing and homogenizing subsystem 408, where the input material 406 is shredded, chopped, shattered, or broken to produce a particulate burnable fuel 410 having a desired particle size distribution. The particulate burnable fuel 410 is then forwarded to a packaging subsystem 416, where the particulate burnable fuel 410 is placed in containers to produce a containerized particulate burnable fuel 418 for ease of shipment or transport and for direct use as a fuel to produce a useable form of energy, to produce a useable product, or to otherwise use the heat derived therefrom. The containerized particulate burnable fuel 418 is then forwarded to a storage subsystem 412, where the containerized particulate burnable fuel 418 is stored for subsequent use as a fuel or fuel component.

Referring now to FIG. 4D, an embodiment of the present system, generally 400, is shown to include a material supply subsystem 402, where one or a plurality of source materials 404 are collected to form an input material 406 for subsequent system processing. The input material 406 can include a variety of components as described above and can be adjusted to achieve a desired compositional makeup of components. The input material 406 is then sized or sized and partially or completely homogenized in a sizing or sizing and homogenizing subsystem 408, where the input material 406 is shredded, chopped, shattered, or broken to produce a particulate burnable fuel 410 having a desired particle size distribution. The particulate burnable fuel 410 is then forwarded to a packaging subsystem 416, where the particulate burnable fuel 410 is placed in containers to produce a containerized particulate burnable fuel 418. The containerized particulate burnable fuel 418 is then forwarded to a combustion subsystem 414, where a portion of the heat generated by combustion of the containerized particulate burnable fuel 418 is converted into a useable form of energy, into heat and a useable product or into heat for subsequent use.

Referring now to FIG. 4E, an embodiment of the present system, generally 400, is shown to include a material supply subsystem 402, where one or a plurality of source materials 404 are collected to form an input material 406 for subsequent system processing. The input material 406 can include a variety of components as described above and can be adjusted to achieve a desired compositional makeup of components. The input material 406 is then sized or sized and partially or completely homogenized in a sizing or sizing and homogenizing subsystem 408, where the input material 406 is shredded, chopped, shattered, or broken to produce a particulate burnable fuel 410 having a desired particle size distribution. The particulate burnable fuel 410 is then forwarded to a shaping subsystem 420, where the particulate burnable fuel 410 is shaped into a compact shape to produce a shaped burnable fuel 422. The shaped burnable fuel 422 is then forwarded to a storage subsystem 412, where the shaped burnable fuel 422 is stored for subsequent use as a fuel or fuel component.

Referring now to FIG. 4F, an embodiment of the present system, generally 400, is shown to include a material supply subsystem 402, where one or a plurality of source materials 404 are collected to form an input material 406 for subsequent system processing. The input material 406 can include a variety of components as described above and can be adjusted to achieve a desired compositional makeup of components. The input material 406 is then sized or sized and partially or completely homogenized in a sizing or sizing and homogenizing subsystem 408, where the input material 406 is shredded, chopped, shattered, or broken to produce a particulate burnable fuel 410 having a desired particle size distribution. The particulate burnable fuel 410 is then forwarded to a shaping subsystem 420, where the particulate burnable fuel 410 is shaped into a compact shape to produce a shaped burnable fuel 422. The shaped burnable fuel 422 is then forwarded to a combustion subsystem 414, where a portion of the heat generated by combustion of the shaped burnable fuel 422 is converted into a useable form of energy, into heat and a useable product or into heat for subsequent use.

Referring now to FIG. 4G, an embodiment of the present system, generally 400, is shown to include a material supply subsystem 402, where one or a plurality of source materials 404 are collected to form an input material 406 for subsequent system processing. The input material 406 can include a variety of components as described above and can be adjusted to achieve a desired compositional makeup of components. The input material 406 is then sized or sized and partially or completely homogenized in a sizing or sizing and homogenizing subsystem 408, where the input material 406 is shredded, chopped, shattered, or broken to produce a particulate burnable fuel 410 having a desired particle size distribution. The particulate burnable fuel 410 is then forwarded to a shaping subsystem 420, where the particulate burnable fuel 410 is shaped into a compact shape to produce a shaped burnable fuel 422. The shaped burnable fuel 422 is then forwarded to a packaging subsystem 416, where the shaped burnable fuel 422 is placed in containers to produce a containerized shaped burnable fuel 424. The containerized shaped burnable fuel 424 is then forwarded to a storage subsystem 412, where the containerized particulate burnable fuel 424 is stored for subsequent use as a fuel or fuel component.

Referring now to FIG. 4H, an embodiment of the present system, generally 400, is shown to include a material supply subsystem 402, where one or a plurality of source materials 404 are collected to form an input material 406 for subsequent system processing. The input material 406 can include a variety of components as described above and can be adjusted to achieve a desired compositional makeup of components. The input material 406 is then sized or sized and partially or completely homogenized in a sizing or sizing and homogenizing subsystem 408, where the input material 406 is shredded, chopped, shattered, or broken to produce a particulate burnable fuel 410 having a desired particle size distribution. The particulate burnable fuel 410 is then forwarded to a shaping subsystem 420, where the particulate burnable fuel 410 is shaped into a compact shape to produce a shaped burnable fuel 422. The shaped burnable fuel 422 is then forwarded to a packaging subsystem 416, where the shaped burnable fuel 422 is placed in containers to produce a containerized shaped burnable fuel 424. The containerized shaped burnable fuel 424 is then forwarded to a combustion subsystem 414, where a portion of the heat generated by combustion of the containerized shaped burnable fuel 422 is converted into a useable form of energy, into heat and a useable product or into heat for subsequent use.

In each of the above systems, the particulate burnable fuel can be pre-processed or pre-treated in a second pre-processing or pre-treating subsystem as shown in FIG. 5A-H.

Systems with Pre-Processing Subsystem

Referring now to FIG. 5A, an embodiment of the present system, generally 500, is shown to include a material supply subsystem 502, where one or a plurality of source materials 504 are collected to form an input material 506 for subsequent system processing. The input material 506 can include a variety of components as described above and can be adjusted to achieve a desired compositional makeup of components. The input material 506 is then pre-processed in a pre-processing subsystem 508, where the input material 506 is pre-processed in one or a plurality of pre-processing steps to form a pre-processed material 510. The pre-processed material 510 is then sized or sized and partially or completely homogenized in a sizing or sizing and homogenizing subsystem 512, where the pre-processed material 510 is shredded, chopped, shattered, or broken to produce a particulate burnable fuel 514 having a desired particle size distribution. The particular burnable fuel 514 may be pre-processed or pre-treated in a second pro-processing or pre-treating subsystem 516. The particulate burnable fuel 514 is then forwarded to a storage subsystem 518, where the particulate burnable fuel 514 is stored for subsequent use as a fuel or fuel component.

Referring now to FIG. 5B, an embodiment of the present system, generally 500, is shown to include a material supply subsystem 502, where one or a plurality of source materials 504 are collected to form an input material 506 for subsequent system processing. The input material 506 can include a variety of components as described above and can be adjusted to achieve a desired compositional makeup of components. The input material 506 is then pre-processed in a pre-processing subsystem 508, where the input material 506 is pre-processed in one or a plurality of pre-processing steps to form a pre-processed material 510. The pre-processed material 510 is then sized or sized and partially or completely homogenized in a sizing or sizing and homogenizing subsystem 512, where the pre-processed material 510 is shredded, chopped, shattered, or broken to produce a particulate burnable fuel 514 having a desired particle size distribution. The particular burnable fuel 514 may be pre-processed or pre-treated in a second pro-processing or pre-treating subsystem 516. The particulate burnable fuel 514 is then forwarded to a combustion subsystem 520, where a portion of the heat generated by combustion of the particulate burnable fuel 514 is converted into a useable form of energy, into heat and a useable product or into heat for subsequent use.

Referring now to FIG. 5C, an embodiment of the present system, generally 500, is shown to include a material supply subsystem 502, where one or a plurality of source materials 504 are collected to form an input material 506 for subsequent system processing. The input material 506 can include a variety of components as described above and can be adjusted to achieve a desired compositional makeup of components. The input material 506 is then pre-processed in a pre-processing subsystem 508, where the input material 506 is pre-processed in one or a plurality of pre-processing steps to form a pre-processed material 510. The pre-processed material 510 is then sized or sized and partially or completely homogenized in a sizing or sizing and homogenizing subsystem 512, where the pre-processed material 510 is shredded, chopped, shattered, or broken to produce a particulate burnable fuel 514 having a desired particle size distribution. The particular burnable fuel 514 may be pre-processed or pre-treated in a second pro-processing or pre-treating subsystem 516. The particulate burnable fuel 514 is then forwarded to a packaging subsystem 522, where the particulate burnable fuel 514 is placed in containers to produce a containerized particulate burnable fuel 524. The containerized particulate burnable fuel 524 is then forwarded to a storage subsystem 518, where the containerized particulate burnable fuel 524 is stored for subsequent use as a fuel or fuel component.

Referring now to FIG. 5D, an embodiment of the present system, generally 500, is shown to include a material supply subsystem 502, where one or a plurality of source materials 504 are collected to form an input material 506 for subsequent system processing. The input material 506 can include a variety of components as described above and can be adjusted to achieve a desired compositional makeup of components. The input material 506 is then pre-processed in a pre-processing subsystem 508, where the input material 506 is pre-processed in one or a plurality of pre-processing steps to form a pre-processed material 510. The pre-processed material 510 is then sized or sized and partially or completely homogenized in a sizing or sizing and homogenizing subsystem 512, where the pre-processed material 510 is shredded, chopped, shattered, or broken to produce a particulate burnable fuel 514 having a desired particle size distribution. The particular burnable fuel 514 may be pre-processed or pre-treated in a second pro-processing or pre-treating subsystem 516. The particulate burnable fuel 514 is then forwarded to a packaging subsystem 522, where the particulate burnable fuel 514 is placed in containers to produce a containerized particulate burnable fuel 524. The containerized particulate burnable fuel 524 is then forwarded to a combustion subsystem 520, where a portion of the heat generated by combustion of the containerized particulate burnable fuel 524 is converted into a useable form of energy, into heat and a useable product or into heat for subsequent use.

Referring now to FIG. 5E, an embodiment of the present system, generally 500, is shown to include a material supply subsystem 502, where one or a plurality of source materials 504 are collected to form an input material 506 for subsequent system processing. The input material 506 can include a variety of components as described above and can be adjusted to achieve a desired compositional makeup of components. The input material 506 is then pre-processed in a pre-processing subsystem 508, where the input material 506 is pre-processed in one or a plurality of pre-processing steps to form a pre-processed material 510. The pre-processed material 510 is then sized or sized and partially or completely homogenized in a sizing or sizing and homogenizing subsystem 512, where the pre-processed material 510 is shredded, chopped, shattered, or broken to produce a particulate burnable fuel 514 having a desired particle size distribution. The particular burnable fuel 514 may be pre-processed or pre-treated in a second pro-processing or pre-treating subsystem 516. The particulate burnable fuel 514 is then forwarded to a shaping subsystem 526, where the particulate burnable fuel 510 is shaped into a compact shape to produce a shaped burnable fuel 528. The shaped burnable fuel 528 is then forwarded to a storage subsystem 518, where the shaped burnable fuel 528 is stored for subsequent use as a fuel or fuel component.

Referring now to FIG. 5F, an embodiment of the present system, generally 500, is shown to include a material supply subsystem 502, where one or a plurality of source materials 504 are collected to form an input material 506 for subsequent system processing. The input material 506 can include a variety of components as described above and can be adjusted to achieve a desired compositional makeup of components. The input material 506 is then pre-processed in a pre-processing subsystem 508, where the input material 506 is pre-processed in one or a plurality of pre-processing steps to form a pre-processed material 510. The pre-processed material 510 is then sized or sized and partially or completely homogenized in a sizing or sizing and homogenizing subsystem 512, where the pre-processed material 510 is shredded, chopped, shattered, or broken to produce a particulate burnable fuel 514 having a desired particle size distribution. The particular burnable fuel 514 may be pre-processed or pre-treated in a second pro-processing or pre-treating subsystem 516. The particulate burnable fuel 514 is then forwarded to a shaping subsystem 526, where the particulate burnable fuel 514 is shaped into a compact shape to produce a shaped burnable fuel 528. The shaped burnable fuel 528 is then forwarded to a combustion subsystem 520, where a portion of the heat generated by combustion of the shaped burnable fuel 528 is converted into a useable form of energy, into heat and a useable product or into heat for subsequent use.

Referring now to FIG. 5G, an embodiment of the present system, generally 500, is shown to include a material supply subsystem 502, where one or a plurality of source materials 504 are collected to form an input material 506 for subsequent system processing. The input material 506 can include a variety of components as described above and can be adjusted to achieve a desired compositional makeup of components. The input material 506 is then pre-processed in a pre-processing subsystem 508, where the input material 506 is pre-processed in one or a plurality of pre-processing steps to form a pre-processed material 510. The pre-processed material 510 is then sized or sized and partially or completely homogenized in a sizing or sizing and homogenizing subsystem 512, where the pre-processed material 510 is shredded, chopped, shattered, or broken to produce a particulate burnable fuel 514 having a desired particle size distribution. The particular burnable fuel 514 may be pre-processed or pre-treated in a second pro-processing or pre-treating subsystem 516. The particulate burnable fuel 514 is then forwarded to a shaping subsystem 526, where the particulate burnable fuel 514 is shaped into a compact shape to produce a shaped burnable fuel 528. The shaped burnable fuel 528 is then forwarded to a packaging subsystem 522, where the shaped burnable fuel 528 is placed in containers to produce a containerized shaped burnable fuel 530. The containerized shaped burnable fuel 530 is then forwarded to a storage subsystem 518, where the containerized particulate burnable fuel 530 is stored for subsequent use as a fuel or fuel component.

Referring now to FIG. 5H, an embodiment of the present system, generally 500, is shown to include a material supply subsystem 502, where one or a plurality of source materials 504 are collected to form an input material 506 for subsequent system processing. The input material 506 can include a variety of components as described above and can be adjusted to achieve a desired compositional makeup of components. The input material 506 is then pre-processed in a pre-processing subsystem 508, where the input material 506 is pre-processed in one or a plurality of pre-processing steps to form a pre-processed material 510. The pre-processed material 510 is then sized or sized and partially or completely homogenized in a sizing or sizing and homogenizing subsystem 512, where the pre-processed material 510 is shredded, chopped, shattered, or broken to produce a particulate burnable fuel 514 having a desired particle size distribution. The particular burnable fuel 514 may be pre-processed or pre-treated in a second pro-processing or pre-treating subsystem 516. The particulate burnable fuel 514 is then forwarded to a shaping subsystem 526, where the particulate burnable fuel 514 is shaped into a compact shape to produce a shaped burnable fuel 528. The shaped burnable fuel 528 is then forwarded to a packaging subsystem 522, where the shaped burnable fuel 528 is placed in containers to produce a containerized shaped burnable fuel 530. The containerized shaped burnable fuel 530 is then forwarded to a combustion subsystem 520, where a portion of the heat generated by combustion of the containerized shaped burnable fuel 530 is converted into a useable form of energy, into heat and a useable product or into heat for subsequent use.

Systems with Two Source Materials

Figure 6A:
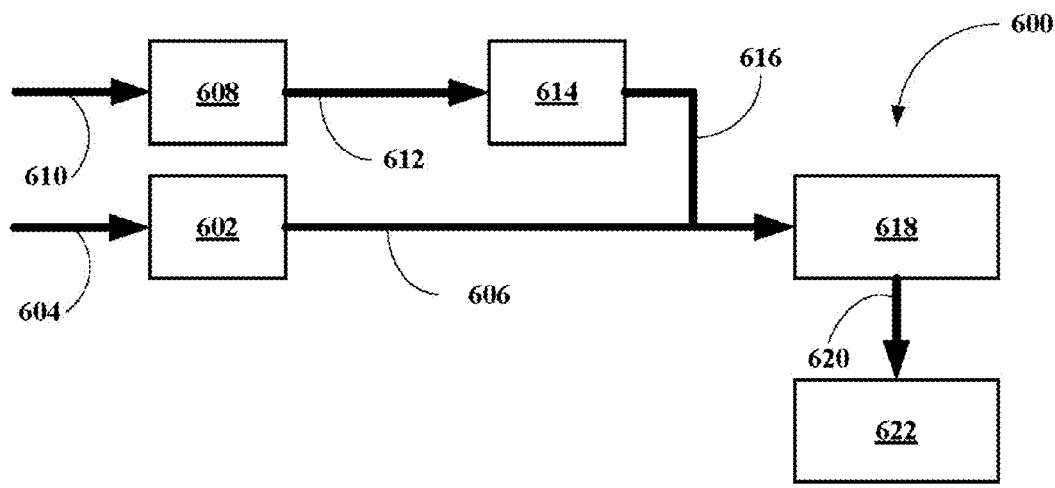

Referring now to FIG. 6A, an embodiment of the present system, generally 600, is shown to include a first material supply subsystem 602, where one or a plurality of first source materials 604 are collected to form a first input material 606. The system 600 also includes a second material supply subsystem 608, where one or a plurality of second source materials 610 are collected to form a second input material 612. The first and second input materials 606 and 612 can include a variety of components as described above and can be adjusted to achieve a desired compositional makeup of components. The second input material 612 is then pre-processed in a pre-processing subsystem 614, where the second input material 606 is pre-processed in one or a plurality of pre-processing steps to form a pre-processed material 616. The first input material 606 and the pre-processed material 616 are then combined and forwarded to a sizing or sizing and homogenizing subsystem 618, where the materials 606 and 616 are shredded, chopped, shattered, or broken to produce a particulate burnable fuel 620 having a desired particle size distribution. The particulate burnable fuel 620 is then forwarded to a storage subsystem 622, where the particulate burnable fuel 620 is stored for subsequent use as a fuel or fuel component.

Figure 6B:
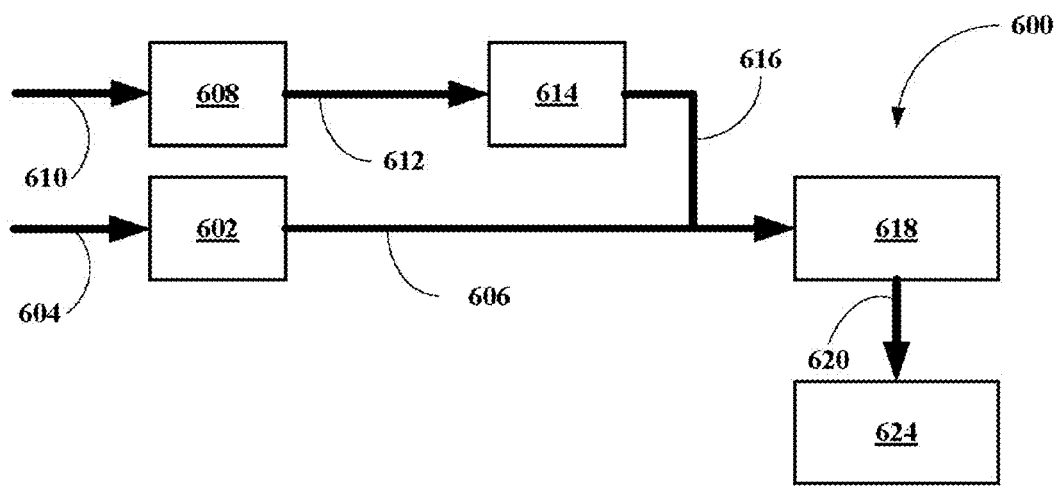

Referring now to FIG. 6B, an embodiment of the present system, generally 600, is shown to include a first material supply subsystem 602, where one or a plurality of first source materials 604 are collected to form a first input material 606. The system 600 also includes a second material supply subsystem 608, where one or a plurality of second source materials 610 are collected to form a second input material 612. The first and second input materials 606 and 612 can include a variety of components as described above and can be adjusted to achieve a desired compositional makeup of components. The second input material 612 is then pre-processed in a pre-processing subsystem 614, where the second input material 606 is pre-processed in one or a plurality of pre-processing steps to form a pre-processed material 616. The first input material 606 and the pre-processed material 616 are then combined and forwarded to a sizing or sizing and homogenizing subsystem 618, where the materials 606 and 616 are shredded, chopped, shattered, or broken to produce a particulate burnable fuel 620 having a desired particle size distribution. The particulate burnable fuel 614 is then forwarded to a combustion subsystem 624, where a portion of the heat generated by combustion of the particulate burnable fuel 614 is converted into a useable form of energy, into heat and a useable product or into heat for subsequent use.

Figure 6C:
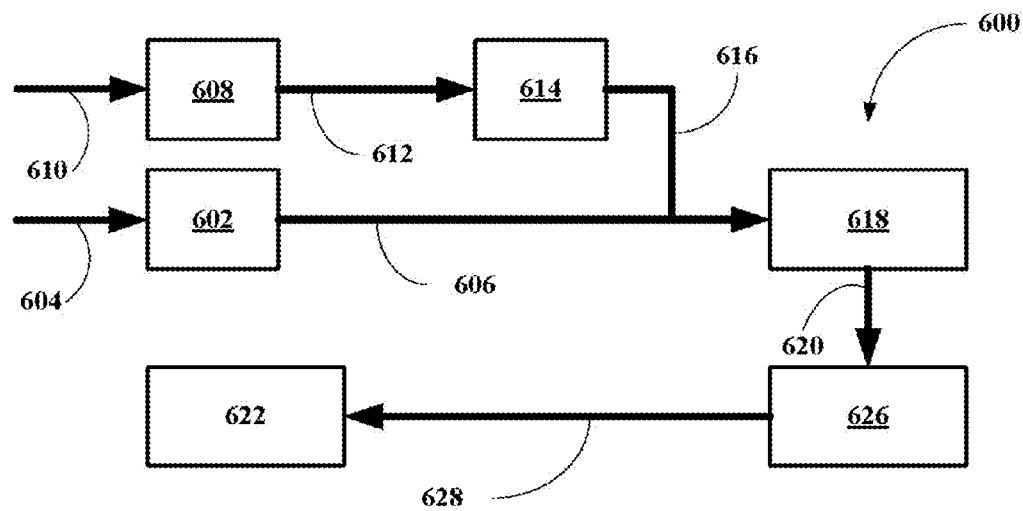

Referring now to FIG. 6C, an embodiment of the present system, generally 600, is shown to include a first material supply subsystem 602, where one or a plurality of first source materials 604 are collected to form a first input material 606. The system 600 also includes a second material supply subsystem 608, where one or a plurality of second source materials 610 are collected to form a second input material 612. The first and second input materials 606 and 612 can include a variety of components as described above and can be adjusted to achieve a desired compositional makeup of components. The second input material 612 is then pre-processed in a pre-processing subsystem 614, where the second input material 606 is pre-processed in one or a plurality of pre-processing steps to form a pre-processed material 616. The first input material 606 and the pre-processed material 616 are then combined and forwarded to a sizing or sizing and homogenizing subsystem 618, where the materials 606 and 616 are shredded, chopped, shattered, or broken to produce a particulate burnable fuel 620 having a desired particle size distribution. The particulate burnable fuel 620 is then forwarded to a packaging subsystem 626, where the particulate burnable fuel 620 is placed in containers to produce a containerized particulate burnable fuel 628. The containerized particulate burnable fuel 628 is then forwarded to a storage subsystem 622, where the containerized particulate burnable fuel 628 is stored for subsequent use as a fuel or fuel component.

Figure 6D:
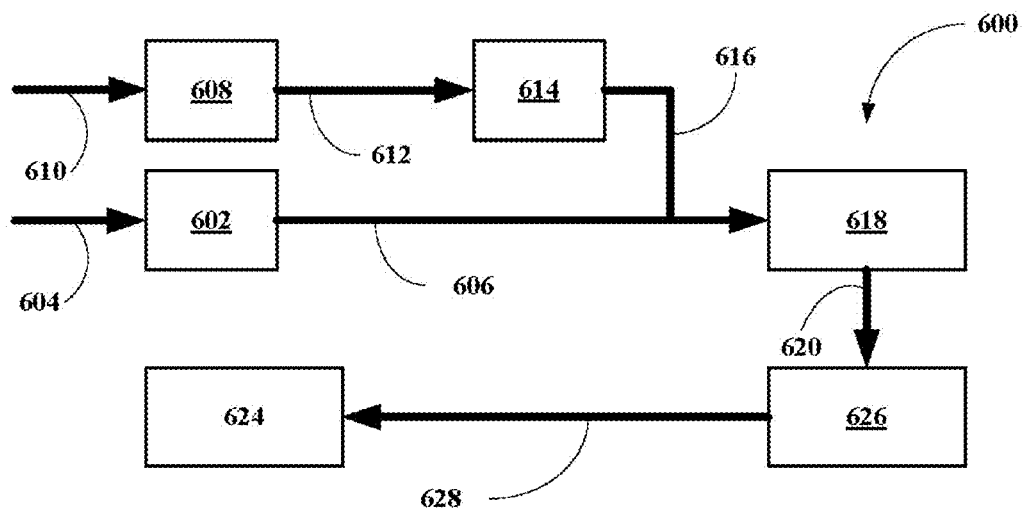

Referring now to FIG. 6D, an embodiment of the present system, generally 600, is shown to include a first material supply subsystem 602, where one or a plurality of first source materials 604 are collected to form a first input material 606. The system 600 also includes a second material supply subsystem 608, where one or a plurality of second source materials 610 are collected to form a second input material 612. The first and second input materials 606 and 612 can include a variety of components as described above and can be adjusted to achieve a desired compositional makeup of components. The second input material 612 is then pre-processed in a pre-processing subsystem 614, where the second input material 606 is pre-processed in one or a plurality of pre-processing steps to form a pre-processed material 616. The first input material 606 and the pre-processed material 616 are then combined and forwarded to a sizing or sizing and homogenizing subsystem 618, where the materials 606 and 616 are shredded, chopped, shattered, or broken to produce a particulate burnable fuel 620 having a desired particle size distribution. The particulate burnable fuel 620 is then forwarded to a packaging subsystem 626, where the particulate burnable fuel 620 is placed in containers to produce a containerized particulate burnable fuel 628. The containerized particulate burnable fuel 628 is then forwarded to a combustion subsystem 624, where a portion of the heat generated by combustion of the containerized particulate burnable fuel 628 is converted into a useable form of energy, into heat and a useable product or into heat for subsequent use.

Figure 6E:
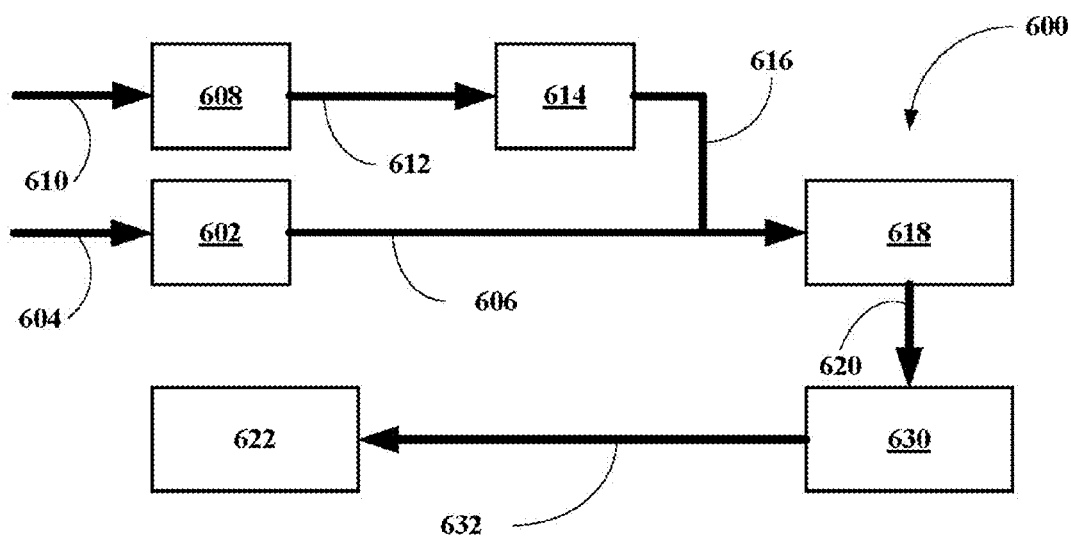

Referring now to FIG. 6E, an embodiment of the present system, generally 600, is shown to include a first material supply subsystem 602, where one or a plurality of first source materials 604 are collected to form a first input material 606. The system 600 also includes a second material supply subsystem 608, where one or a plurality of second source materials 610 are collected to form a second input material 612. The first and second input materials 606 and 612 can include a variety of components as described above and can be adjusted to achieve a desired compositional makeup of components. The second input material 612 is then pre-processed in a pre-processing subsystem 614, where the second input material 606 is pre-processed in one or a plurality of pre-processing steps to form a pre-processed material 616. The first input material 606 and the pre-processed material 616 are then combined and forwarded to a sizing or sizing and homogenizing subsystem 618, where the materials 606 and 616 are shredded, chopped, shattered, or broken to produce a particulate burnable fuel 620 having a desired particle size distribution. The particulate burnable fuel 620 is then forwarded to a shaping subsystem 630, where the particulate burnable fuel 620 is shaped into a compact shape to produce a shaped burnable fuel 632. The shaped burnable fuel 632 is then forwarded to a storage subsystem 622, where the shaped burnable fuel 632 is stored for subsequent use as a fuel or fuel component.

Figure 6F:
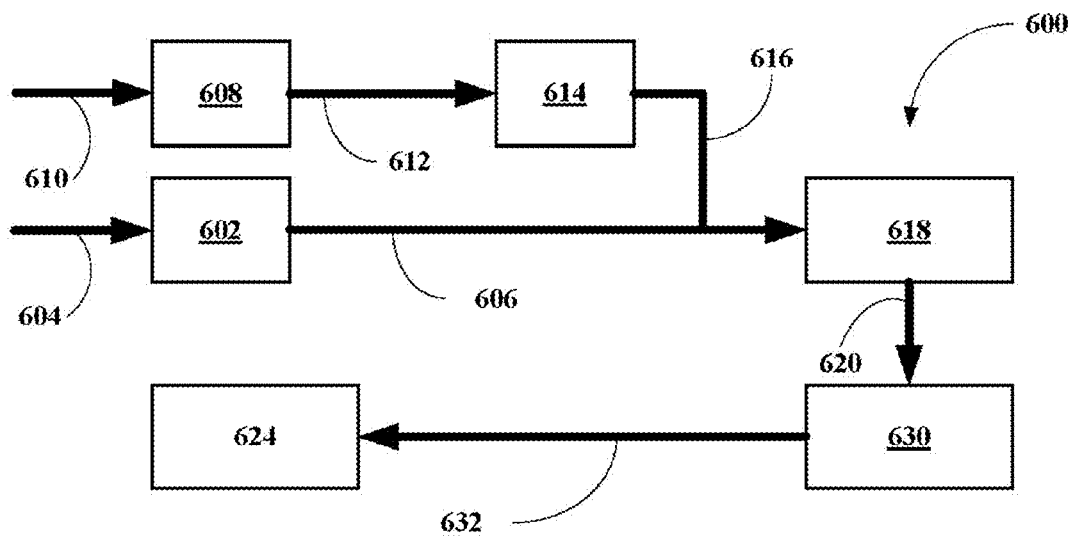

Referring now to FIG. 6F, an embodiment of the present system, generally 600, is shown to include a first material supply subsystem 602, where one or a plurality of first source materials 604 are collected to form a first input material 606. The system 600 also includes a second material supply subsystem 608, where one or a plurality of second source materials 610 are collected to form a second input material 612. The first and second input materials 606 and 612 can include a variety of components as described above and can be adjusted to achieve a desired compositional makeup of components. The second input material 612 is then pre-processed in a pre-processing subsystem 614, where the second input material 606 is pre-processed in one or a plurality of pre-processing steps to form a pre-processed material 616. The first input material 606 and the pre-processed material 616 are then combined and forwarded to a sizing or sizing and homogenizing subsystem 618, where the materials 606 and 616 are shredded, chopped, shattered, or broken to produce a particulate burnable fuel 620 having a desired particle size distribution. The particulate burnable fuel 620 is then forwarded to a shaping subsystem 630, where the particulate burnable fuel 620 is shaped into a compact shape to produce a shaped burnable fuel 632. The shaped burnable fuel 632 is then forwarded to a combustion subsystem 624, where a portion of the heat generated by combustion of the shaped burnable fuel 632 is converted into a useable form of energy, into heat and a useable product or into heat for subsequent use.

Figure 6G:
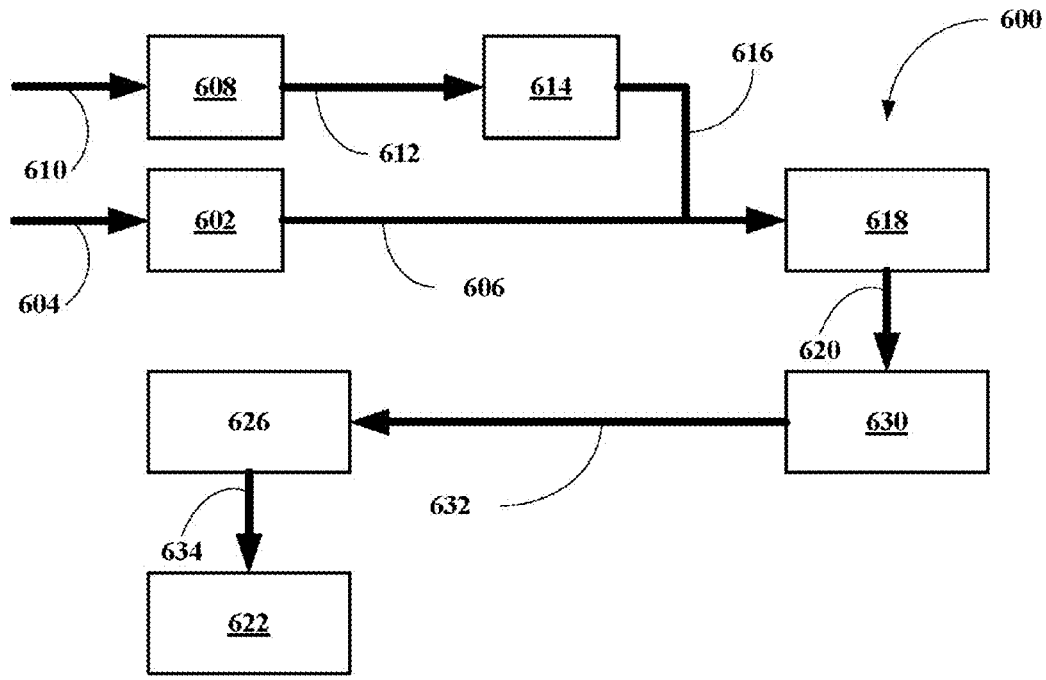

Referring now to FIG. 6G, an embodiment of the present system, generally 600, is shown to include a first material supply subsystem 602, where one or a plurality of first source materials 604 are collected to form a first input material 606. The system 600 also includes a second material supply subsystem 608, where one or a plurality of second source materials 610 are collected to form a second input material 612. The first and second input materials 606 and 612 can include a variety of components as described above and can be adjusted to achieve a desired compositional makeup of components. The second input material 612 is then pre-processed in a pre-processing subsystem 614, where the second input material 606 is pre-processed in one or a plurality of pre-processing steps to form a pre-processed material 616. The first input material 606 and the pre-processed material 616 are then combined and forwarded to a sizing or sizing and homogenizing subsystem 618, where the materials 606 and 616 are shredded, chopped, shattered, or broken to produce a particulate burnable fuel 620 having a desired particle size distribution. The particulate burnable fuel 620 is then forwarded to a shaping subsystem 630, where the particulate burnable fuel 620 is shaped into a compact shape to produce a shaped burnable fuel 632. The shaped burnable fuel 632 is then forwarded to a packaging subsystem 626, where the shaped burnable fuel 632 is placed in containers to produce a containerized shaped burnable fuel 634. The containerized shaped burnable fuel 634 is then forwarded to a storage subsystem 622, where the containerized shaped burnable fuel 634 is stored for subsequent use as a fuel or fuel component.

Figure 6H:
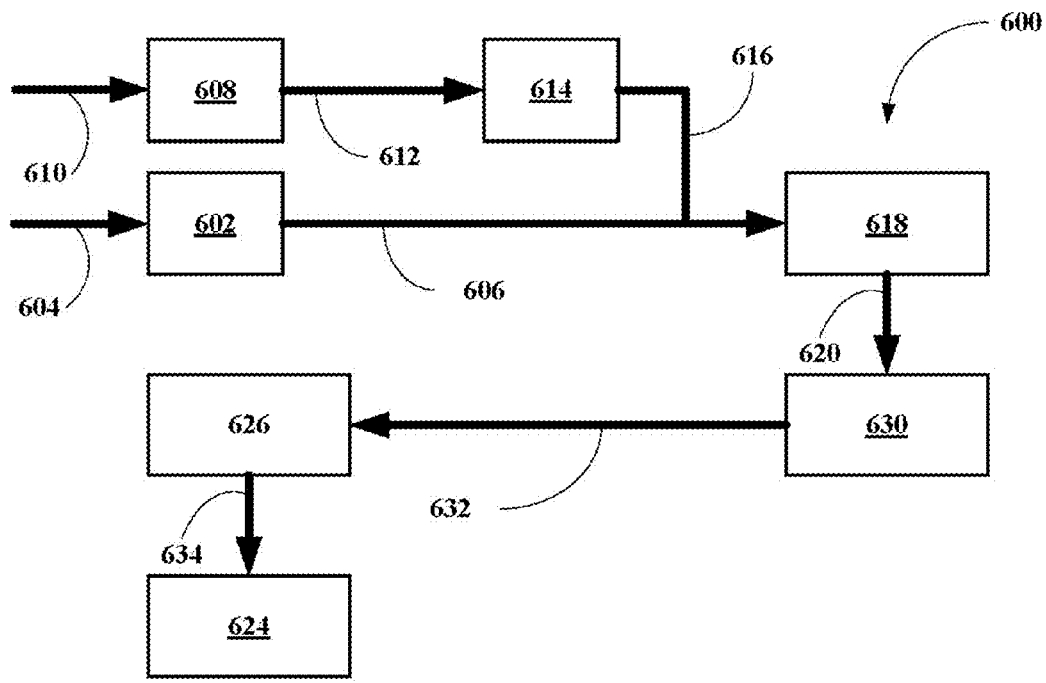

Referring now to FIG. 6H, an embodiment of the present system, generally 600, is shown to include a first material supply subsystem 602, where one or a plurality of first source materials 604 are collected to form a first input material 606. The system 600 also includes a second material supply subsystem 608, where one or a plurality of second source materials 610 are collected to form a second input material 612. The first and second input materials 606 and 612 can include a variety of components as described above and can be adjusted to achieve a desired compositional makeup of components. The second input material 612 is then pre-processed in a pre-processing subsystem 614, where the second input material 606 is pre-processed in one or a plurality of pre-processing steps to form a pre-processed material 616. The first input material 606 and the pre-processed material 616 are then combined and forwarded to a sizing or sizing and homogenizing subsystem 618, where the materials 606 and 616 are shredded, chopped, shattered, or broken to produce a particulate burnable fuel 620 having a desired particle size distribution. The particulate burnable fuel 620 is then forwarded to a shaping subsystem 630, where the particulate burnable fuel 620 is shaped into a compact shape to produce a shaped burnable fuel 632. The shaped burnable fuel 632 is then forwarded to a packaging subsystem 626, where the shaped burnable fuel 632 is placed in containers to produce a containerized shaped burnable fuel 634. The containerized shaped burnable fuel 634 is then forwarded to a combustion subsystem 624, where a portion of the heat generated by combustion of the containerized shaped burnable fuel 634 is converted into a useable form of energy, into heat and a useable product or into heat for subsequent use.

In each of the above systems, the particulate burnable fuel can be pre-processed or pre-treated in a second pre-processing or pre-treating subsystem as shown in FIG. 5A-H.

EXPERIMENTS OF THE INVENTION

Example 1

The following data was obtained from a pilot plant facility, where used or waste material was disinfected and shredded to form the particulate burnable fuel of the present invention.

Used or waste material was analyzed based on component makeup. The analysis revealed the component ranges set forth in Table I.

TABLE I

Constituent List and Ranges

| Constituent | % Range | | % Typical |
|---|---|---|---|
| | Low | High | |
| Plastic | 50 | 100 | 70 |
| Cardboard | 15 | 100 | 29 |
| Stainless Steel | 0 | 5 | 1 |

Example 2

The following data was obtained from a pilot plant facility, where used or waste material was disinfected and shredded to form a burnable fuel and an ash obtained from burning of other used or waste material were burned and the resulting ash analyzed.

Samples were received in 2.5 gallon buckets and were non-homogeneous. Samples were shredded for particle size reduction. Coarsely milled and finely milled sample splits were returned and showed some inhomogeneity. The more finely milled sample split was utilized for all analyses.

Due to sample inhomogeneity, all analyses were performed multiple times (duplicate minimum) and values reported as represent "best value" averages. All data were reported on a finely milled sample weight basis.

Samples were stage ashed to 750° C. and held at temperature for 8 hours for ash percentage determination. After weighing, ash residues were fused with lithium metaborate for ash component analyses.

Metals except for mercury were determined by ICP-AES and ICP-MS after total sample decomposition with mixed acids including hydrofluoric acid or by high temperature fusion of sample ash with lithium metaborate. Mercury was determined by combustion/amalgamation cold vapor atomic absorption.

Bromide, chloride, nitrate, sulfate, and ortho-phosphate were measured by ion chromatography on washings from oxygen bomb combustion, and do not necessarily represent elements in these oxidation states prior to combustion.

Higher heating value is the gross calorific content and has not been corrected for possible sulfur content according to ASTM D5865.

The incinerated ash had a heat content of 5321 BTU/lb (12,377 MJ/kg) and a 49 wt. % residue after burning at 750° C. The resulting ash had an elemental analysis tabulated in TABLE II.

TABLE II

Element Analysis of Ash in µg/g

| $Br^-$ | $Cl^-$ | $NO_3^-$ | $SO_4^{2-}$ | $o\text{-}PO_4^{3-}$ | Ag | Al |
|---|---|---|---|---|---|---|
| 60 | 1730 | 440 | 2840 | <20 | 26 | 36500 |
| As | Ba | Be | Cd | Ca | Co | Cr |
| 3.6 | 6000 | 0.7 | 1.5 | 23600 | 24 | 1060 |
| Cu | Fe | Pb | Mg | Mn | Hg | Ni |
| 450 | 12100 | 162 | 7800 | 340 | 0.12 | 500 |
| K | Si | Na | Tl | Ti | Zn | |
| 5370 | 119000 | 16700 | 0.04 | 5560 | 4390 | |

The particulate burnable fuel had heat content of 16,400 BTU/lb (38,150 MJ/kg) and a 5.6 wt. % residue after burning at 750° C. The resulting ash had an elemental analysis tabulated in TABLE III.

TABLE III

Element Analysis of Ash in µg/g

| $Br^-$ | $Cl^-$ | $NO_3^-$ | $SO_4^{2-}$ | $o\text{-}PO_4^{3-}$ | Ag | Al | As | Ba |
|---|---|---|---|---|---|---|---|---|
| <20 | 240 | 71000 | 1400 | <20 | 78 | 2420 | 1.6 | 710 |
| Be | Cd | Ca | Co | Cr | Cu | Fe | Pb | Mg |
| 0.1 | 0.1 | 1950 | 33 | 4700 | 110 | 33400 | 24 | 210 |
| Mn | Hg | Ni | K | Si | Na | Tl | Ti | Zn |
| 580 | 0.06 | 2870 | 560 | 5610 | 1280 | <0.01 | 1520 | 330 |

Example 3

A used or waste material was obtained, disinfected, shredded and pelletized.

Referring to FIG. 7, a photograph of the particulate burnable fuel is shown comprising particles between about 19.05 mm and about 38.1 mm. The particulate burnable fuel had a bulk density between about 12 lb/ft³ (0.19 g/cm³) and about 15 lb/ft³ (0.24 g/cm³). The particulate burnable fuel can have a greater or lower density depending on composition and/or processing.

Referring to FIG. 8, the burnable fuel of FIG. 7 was pelletized to form shaped substantially cylindrical shapes. The shapes have a diameter between about 10 mm and about 15 mm and a length between 3 cm and about 5 cm. The shapes are shown here to be cracked with jagged ends. The shaped burnable fuel has a bulk density of between about 20 lb/ft³ (0.32 g/cm³) and about 30 lb/ft³ (0.48 g/cm³). The shaped burnable fuel can have a greater or lower density depending on composition and/or processing.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for making a burnable fuel comprising:
providing a first source material to form an input material, where the source material comprises a mixture of combustible components and non-combustible components, where the non-combustible components include metals present in an amount of 1 wt. % up to 20 wt. % wherein the metals are selected from the group consisting of aluminum, aluminum alloys, iron, iron alloys, nickel, nickel alloys, tin, tin alloys, copper, copper alloys, and/or mixtures of combinations thereof,
disinfecting the input material to form a disinfected material,
sizing or sizing and partially or completely homogenizing the input material into a particulate burnable fuel,
shaping the particulate burnable fuel to form a shaped burnable fuel, and
combusting the shaped burnable fuel in a combustion unit, where a portion of the heat is converted into a useable form of energy, where a portion of the heat is used directly, or where a portion of the heat and an ash is used to prepare an end product.

2. The method of claim 1, further comprising:
prior to the sizing, pre-treating the input material.

3. The method of claim 1, further comprising:
prior to the sizing, providing a second source material,
pre-treating the second source material to form a pre-treated material, and
combining the first source material and the pre-treated material to from the input material.

4. The method of claim 1, further comprising:
prior to the combusting, packaging the shaped burnable fuel to form a containerized shaped burnable fuel.

5. The method of claim 1, further comprising:
after the sizing, pre-treating the particulate burnable fuel.

6. The method of claim 1, wherein the combustible components are selected from the group consisting of pulp materials, fiber materials, fabric materials, polymer materials, binding agents, conventional fuels, and ash materials having a non-zero fuel value and mixtures or combinations thereof.

7. The method of claim 1, wherein the particles have a smallest dimension of between about 0.1 mm and about 1000 mm.

8. The method of claim 1, wherein the shape has dimensions ranging between about 0.5 cm and about 20 cm.

9. The method of claim 1, wherein the shape is a cylindrical shape or substantially cylindrical shape.

10. A method for making a burnable fuel comprising:
providing a first source material to form an input material, where the first source material comprises a complex mixture of components, where the components are selected from the group consisting of pulp materials, fiber materials, fabric materials, polymer materials, ceramic materials, metal materials, and mixtures or combinations and where the first source material includes metals present in an amount up of 1 wt. % to 20 wt. % wherein the metals are selected from the group consisting of aluminum, aluminum alloys, iron, iron alloys, nickel, nickel alloys, tin, tin alloys, copper, copper alloys, and/or mixtures of combinations thereof;
disinfecting the input material to form a disinfected material,
sizing or sizing and partially or completely homogenizing the disinfected material into a particulate burnable fuel, where the fuel is suitable for use as a fuel for cement plants, power plants, municipal incinerators for steam generation, or any other facility that burns fuels and converts heat derived from the burning of the fuel into a usable form of energy or uses the heat and/or ash to make an end product.

11. The method of claim 10, wherein the source materials are derived from used or waste industrial materials, used or waste municipal materials, used or waste healthcare materials, used or waste medical materials, used or waste agricultural materials, used or waste biomass materials, used or waste electronic materials, used or waste metal materials, and mixtures or combinations thereof.

12. The method of claim 10, further comprising:
prior to the sizing, disinfecting the input material.

13. The method of claim 12, further comprising:
shaping the particulate burnable fuel to form a shaped burnable fuel.

14. The method of claim 13, further comprising:
combusting the shaped burnable fuel in a combustion unit, where a portion of the heat is converted into a useable form of energy, where a portion of the heat is used directly, or where a portion of the heat and/or the ash are used to form a product.

15. The method of claim 10, further comprising:
prior to the sizing, pre-treating the input material.

16. The method of claim 10, further comprising:
prior to the sizing, providing a second source material, pre-treating the second source material to form a pre-treated material, and
combining the first source material and the pre-treated material to from the input material.

17. The method of claim 10, further comprising:
combusting the particulate burnable fuel in a combustion unit, where a portion of the heat is converted into a useable form of energy, where a portion of the heat is used directly, or where a portion of the heat and/or the ash are used to form a product.

18. The method of claim 10, further comprising:
packaging the particulate burnable fuel to form a containerized particulate burnable fuel.

19. The method of claim 18, further comprising:
combusting the containerized particulate burnable fuel in a combustion unit, where a portion of the heat is converted into a useable form of energy, where a portion of the heat is used directly, or where a portion of the heat and/or the ash are used to form a product.

20. The method of claim 10, further comprising:
shaping the particulate burnable fuel to form a shaped burnable fuel.

21. The method of claim 20, further comprising:
combusting the shaped burnable fuel in a combustion unit, where a portion of the heat is converted into a useable form of energy, where a portion of the heat is used directly, or where a portion of the heat and/or the ash are used to form a product.

22. The method of claim 20, further comprising:
packaging the shaped burnable fuel to form a containerized shaped burnable fuel.

23. The method of claim 22, further comprising:
combusting the containerized shaped burnable fuel in a combustion unit, where a portion of the heat is converted into a useable form of energy, where a portion of the heat is used directly, or where a portion of the heat and/or the ash are used to form a product.

24. The method of claim 10, further comprising:
after the sizing, pre-treating the particulate burnable fuel.

25. The method of claim 10, wherein the particles have a smallest dimension of between about 0.1 mm and about 1000 mm.

26. The method of claim 20, wherein the shape has dimensions ranging between about 0.5 cm and about 20 cm.

27. The method of claim 26, wherein the shape is a cylindrical shape or substantially cylindrical shape.

* * * * *